US008820151B2

(12) United States Patent
Ito et al.

(10) Patent No.: US 8,820,151 B2
(45) Date of Patent: Sep. 2, 2014

(54) CETANE NUMBER ESTIMATION APPARATUS

(75) Inventors: Yoshiyasu Ito, Toyota (JP); Takeshi Miyaura, Toyota (JP); Makio Tsuchiyama, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/884,231

(22) PCT Filed: Nov. 25, 2011

(86) PCT No.: PCT/JP2011/077884
§ 371 (c)(1),
(2), (4) Date: May 8, 2013

(87) PCT Pub. No.: WO2012/077584
PCT Pub. Date: Jun. 14, 2012

(65) Prior Publication Data

US 2013/0220006 A1 Aug. 29, 2013

(30) Foreign Application Priority Data

Dec. 7, 2010 (JP) ................................ 2010-272643

(51) Int. Cl.
*G01M 15/00* (2006.01)

(52) U.S. Cl.
USPC .................... 73/114.38; 73/35.02; 73/114.55; 73/114.51

(58) Field of Classification Search
USPC .................. 73/114.51, 114.38, 114.55, 35.02
See application file for complete search history.

(56) References Cited

U.S. PATENT DOCUMENTS

| | | | | |
|---|---|---|---|---|
| 5,469,831 | A | 11/1995 | Takahashi | |
| 7,322,341 | B2 * | 1/2008 | Yamaguchi et al. | 123/435 |
| 7,621,174 | B2 * | 11/2009 | Takaku | 73/114.53 |
| 8,042,517 | B2 * | 10/2011 | Nakajima | 123/406.41 |
| 8,060,292 | B2 * | 11/2011 | Takahashi et al. | 701/104 |
| 8,191,412 | B2 * | 6/2012 | Doring | 73/114.71 |
| 8,266,947 | B2 * | 9/2012 | Yoeda | 73/35.02 |

(Continued)

FOREIGN PATENT DOCUMENTS

| | | |
|---|---|---|
| EP | 1 890 024 A1 | 2/2008 |
| JP | 06-280717 A | 10/1994 |

(Continued)

OTHER PUBLICATIONS

International Search Report of PCT/JP2011/077884 dated Mar. 29, 2012.

*Primary Examiner* — Freddie Kirkland, III
(74) *Attorney, Agent, or Firm* — Sughrue Mion, PLLC

(57) ABSTRACT

A cetane number estimation apparatus injects fuel from a fuel injection valve in a diesel engine based on a target fuel injection amount, calculates an indicator of output torque of the diesel engine produced through fuel injection, and estimates the cetane number of the fuel using the calculated indicator. The cetane number estimation apparatus includes a pressure sensor for detecting fuel pressure varied by variation in actual fuel pressure in the fuel injection valve at the time of the fuel injection. The cetane number estimation apparatus also has a pressure correcting section that is adapted to calculate actual operating characteristics of the fuel injection valve based on a variation waveform of the detected fuel pressure and corrects the target fuel injection amount based on the difference between the calculated actual operating characteristics and prescribed reference operating characteristics.

7 Claims, 11 Drawing Sheets

(56) References Cited

U.S. PATENT DOCUMENTS

| | | | | |
|---|---|---|---|---|
| 8,281,643 | B2 * | 10/2012 | Yasuda | 73/35.02 |
| 8,307,695 | B2 * | 11/2012 | Miyaura et al. | 73/35.02 |
| 8,423,267 | B2 * | 4/2013 | Iwatani | 701/105 |
| 2007/0044759 | A1 | 3/2007 | Yamaguchi et al. | |
| 2010/0319444 | A1 | 12/2010 | Miyaura et al. | |
| 2013/0311063 | A1 * | 11/2013 | Ito et al. | 701/103 |
| 2014/0013832 | A1 * | 1/2014 | Tsuchiyama et al. | 73/61.78 |

FOREIGN PATENT DOCUMENTS

| | | | |
|---|---|---|---|
| JP | 07-174040 | A | 7/1995 |
| JP | 08-004577 | A | 1/1996 |
| JP | 09-060542 | A | 3/1997 |
| JP | 10-176580 | A | 6/1998 |
| JP | 2003-314331 | A | 11/2003 |
| JP | 2005-248722 | A | 9/2005 |
| JP | 2005-320872 | A | 11/2005 |
| JP | 2006-029109 | A | 2/2006 |
| JP | 2007-270816 | A | 10/2007 |
| JP | 2008-144749 | A | 6/2008 |
| JP | 2009-057925 | A | 3/2009 |
| JP | 2009-074499 | A | 4/2009 |
| JP | 2010-071187 | A | 4/2010 |
| JP | 2010-084746 | A | 4/2010 |
| WO | 2009/112907 | A1 | 9/2009 |

* cited by examiner

CETANE NUMBER ESTIMATION APPARATUS

FIELD OF THE INVENTION

The present invention relates to a cetane number estimation apparatus for estimating the cetane number of fuel supplied to a diesel engine.

BACKGROUND OF THE INVENTION

In diesel engines, fuel is injected into a combustion chamber through a fuel injection valve and compressed and ignited after a predetermined time (an ignition delay) since fuel injection. To improve output performance and emission performance in a diesel engine, a control device for controlling an engine control parameter such as a fuel injection timing or amount is generally employed with the ignition delay taken into consideration.

The lower the cetane number of fuel, the longer the ignition delay of a diesel engine becomes. Accordingly, if relatively low-cetane fuel such as winter fuel is supplied to a fuel tank in a diesel engine having an engine control parameter that has been set for fuel with a standard cetane number before shipment, the ignition timing of the fuel is delayed and the state of fuel combustion is unfavorable. In some cases, misfire may happen.

To prevent such a problem, it is desirable to correct the engine control parameter based on the actual cetane number of fuel injected into a combustion chamber. For effective correction of the parameter, accurate estimation of the cetane number of the fuel is necessary.

Conventionally, as described in Patent Document 1, a control device for a diesel engine that injects a small amount of fuel from a fuel injection valve and estimates the cetane number of the fuel based on engine torque (output torque) generated through such fuel injection has been proposed. In the control device, the amount of fuel injected from the fuel injection valve of the diesel engine (the fuel injection amount) and the corresponding output torque are detected. With reference to the relationship between the fuel injection amount and the output torque, the cetane number of the fuel is estimated. The control device calculates the fuel injection amount based on fuel pressure detected by a pressure sensor and a variation waveform of the detected fuel pressure. The output torque produced through the fuel injection is calculated using a changing manner of the rotating speed of the output shaft of the diesel engine (the engine speed).

PRIOR ART DOCUMENT

PATENT DOCUMENT 1: Japanese Laid-Open Patent Publication No. 2009-74499

SUMMARY OF INVENTION

To close a fuel injection valve, a valve body moves to block an injection hole through which fuel is injected. In this state, fuel in the gap between the valve body and its valve seat prevents the valve body from moving toward the injection hole. Accordingly, the higher kinematic viscosity of fuel, the slower the speed at which the valve body moves, or the fuel injection valve closes, becomes. As a result, even if operation of the fuel injection valve is controlled in a manner prescribed to inject a constant amount of fuel, the actual fuel injection amount varies in correspondence with the kinematic viscosity of the fuel.

Further, when fuel pressure varies, the speed at which a variation wave transmits through fuel becomes greater as the bulk modulus of elasticity of the fuel becomes higher. Accordingly, in a case in which a pressure sensor detects a variation manner of fuel pressure, which is varied through variation in the actual fuel pressure in a fuel injection valve, the time necessary for a variation wave of the fuel pressure caused by opening or closing the fuel injection valve to reach the mounting position of the pressure sensor varies in correspondence with the bulk modulus of elasticity of the fuel. As a result, when the fuel injection amount is calculated based on a variation manner of the fuel pressure detected by the pressure sensor, as in the control device described in Patent Document 1, the obtained fuel injection amount varies in correspondence with the bulk modulus of elasticity of the fuel even if a constant amount of fuel is injected from a fuel injection valve.

As has been described, the relationship between the fuel injection amount calculated in the device described in Patent Document 1 and the output torque produced through fuel injection changes in correspondence with not only the cetane number of fuel but also other properties of the fuel than the cetane number, such as the kinematic viscosity or the bulk modulus of elasticity of the fuel. As a result, if the cetane number of the fuel is estimated simply based on the relationship between the fuel injection amount and the produced output torque in the device described in Patent Document 1, accuracy of estimation is inevitably decreased due to a difference in the properties of fuel other than the cetane number.

The inventors of the present invention have conducted various tests to measure the cetane number, kinematic viscosity, and bulk modulus of elasticity of fuel. The tests have confirmed that there is no correlation among the cetane number, the kinematic viscosity, and the bulk modulus of elasticity. As a result, it is impossible to estimate the cetane number of fuel using only the kinematic viscosity or the bulk modulus of elasticity of the fuel as a parameter for estimation.

Accordingly, it is an objective of the present invention to provide a cetane number estimation apparatus capable of accurately estimating the cetane number by preventing errors in estimation caused by a difference in other fuel properties than the cetane number.

To achieve the foregoing objective and in accordance with one aspect of the present invention, a cetane number estimation apparatus is provided that injects fuel from a fuel injection valve in a diesel engine based on a target fuel injection amount, calculates an indicator of output torque of the diesel engine produced through fuel injection, and estimates the cetane number of the fuel using the calculated indicator. The apparatus includes a pressure sensor and a pressure connecting section. The pressure sensor detects fuel pressure varied by variation in actual fuel pressure in the fuel injection valve at the time of the fuel injection. The pressure correcting section is adapted to calculate actual operating characteristics of the fuel injection valve based on a variation waveform of the detected fuel pressure, and to correct the target fuel injection amount based on the difference between the calculated actual operating characteristics and prescribed reference operating characteristics.

DESCRIPTION OF EMBODIMENTS

First Embodiment

A cetane number estimation apparatus according to a first embodiment of the present invention will now be described.

Figure 1:
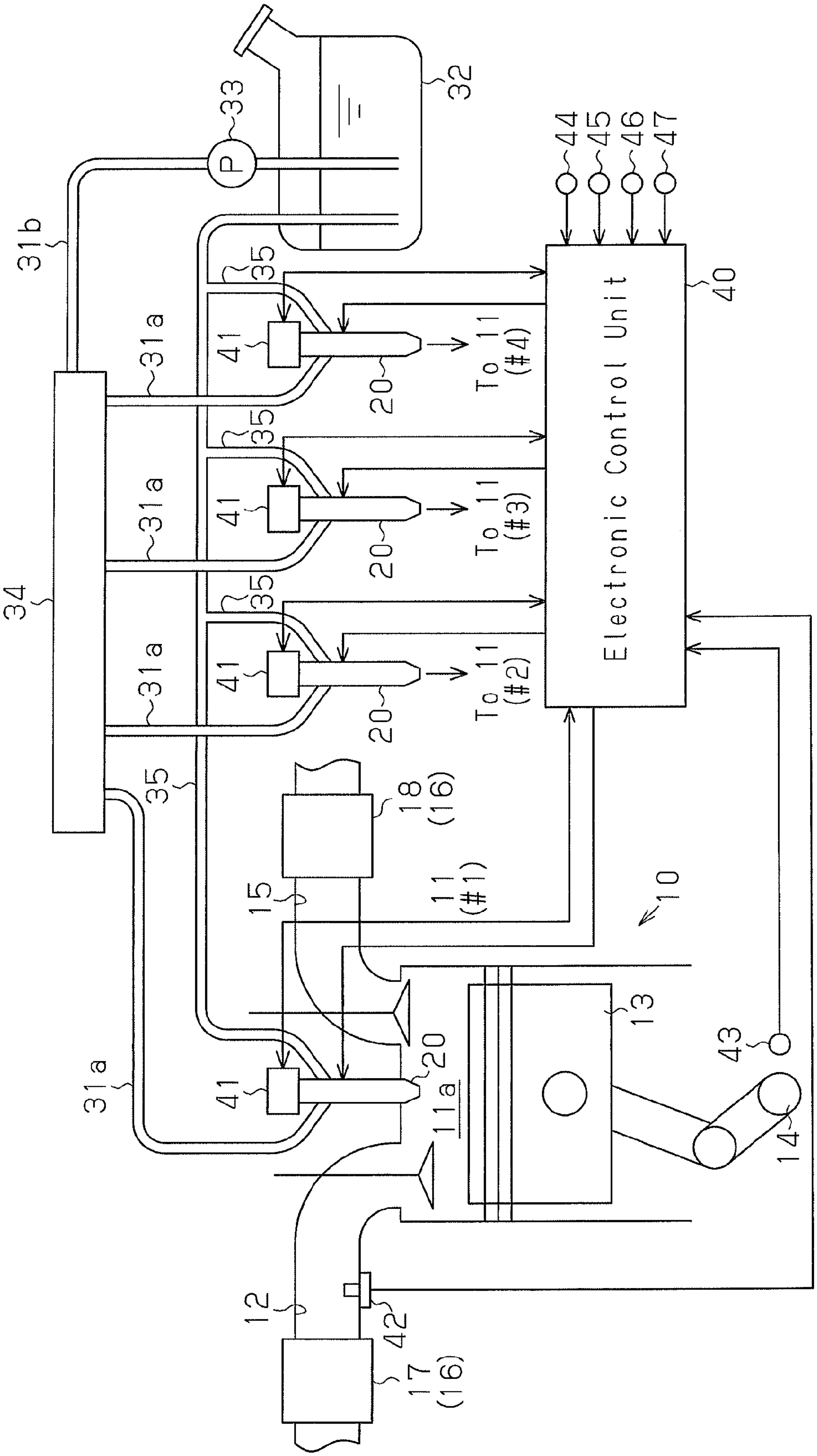
FIG. 1 is a view schematically showing a cetane number estimation apparatus according to a first embodiment of the present invention.

FIG. 1 schematically shows the configuration of the cetane number estimation apparatus of the first embodiment.

As illustrated in FIG. 1, a diesel engine 10 has a plurality of (in the first embodiment, four (#1, #2, #3, and #4)) cylinders 11. An intake passage 12 is connected to the cylinders 11 and air is drawn into the cylinders 11 through the intake passage 12. The diesel engine 10 is mounted in a vehicle as a drive source. A direct injection type fuel injection valve 20 is attached to each of the cylinders 11 to inject fuel directly into the cylinder 11. Specifically, fuel is injected as the fuel injection valves 20 are operated to open. In each cylinder 11, the fuel is exposed to the air that has been drawn, compressed, and heated. This ignites and burns the fuel. In the diesel engine 10, energy produced through fuel combustion in each cylinder 11 depresses a piston 13 to forcibly rotate a crankshaft 14. Combustion gas is drained from the cylinders 11 into an exhaust passage 15 as exhaust gas.

The diesel engine 10 includes an exhaust driven type supercharger 16. The supercharger 16 includes a compressor 17 mounted in the intake passage 12 and a turbine 18 mounted in the exhaust passage 15. The supercharger 16 sends the drawn air passing through the intake passage 12 into the cylinders 11 under pressure, using energy produced by the exhaust gas flowing in the exhaust passage 15.

The respective fuel injection valves 20 are connected to a common rail 34 via corresponding branch lines 31*a*. The common rail 34 is connected to a fuel tank 32 through a supply line 31*b*. A fuel pump 33 for sending fuel to the common rail 34 under pressure is mounted in the supply line 31*b*. In the first embodiment, the fuel having an increased pressure that has been sent by the fuel pump 33 under pressure is stored in the common rail 34 and fed into the fuel injection valves 20 through the corresponding branch lines 31*a*. Return lines 35 are connected to the respective fuel injection valves 20. Each of the return lines 35 is connected to the fuel tank 32. Some fuel is returned from the interior of each fuel injection valve 20 to the fuel tank 32 through the corresponding return line 35.

Figure 2:
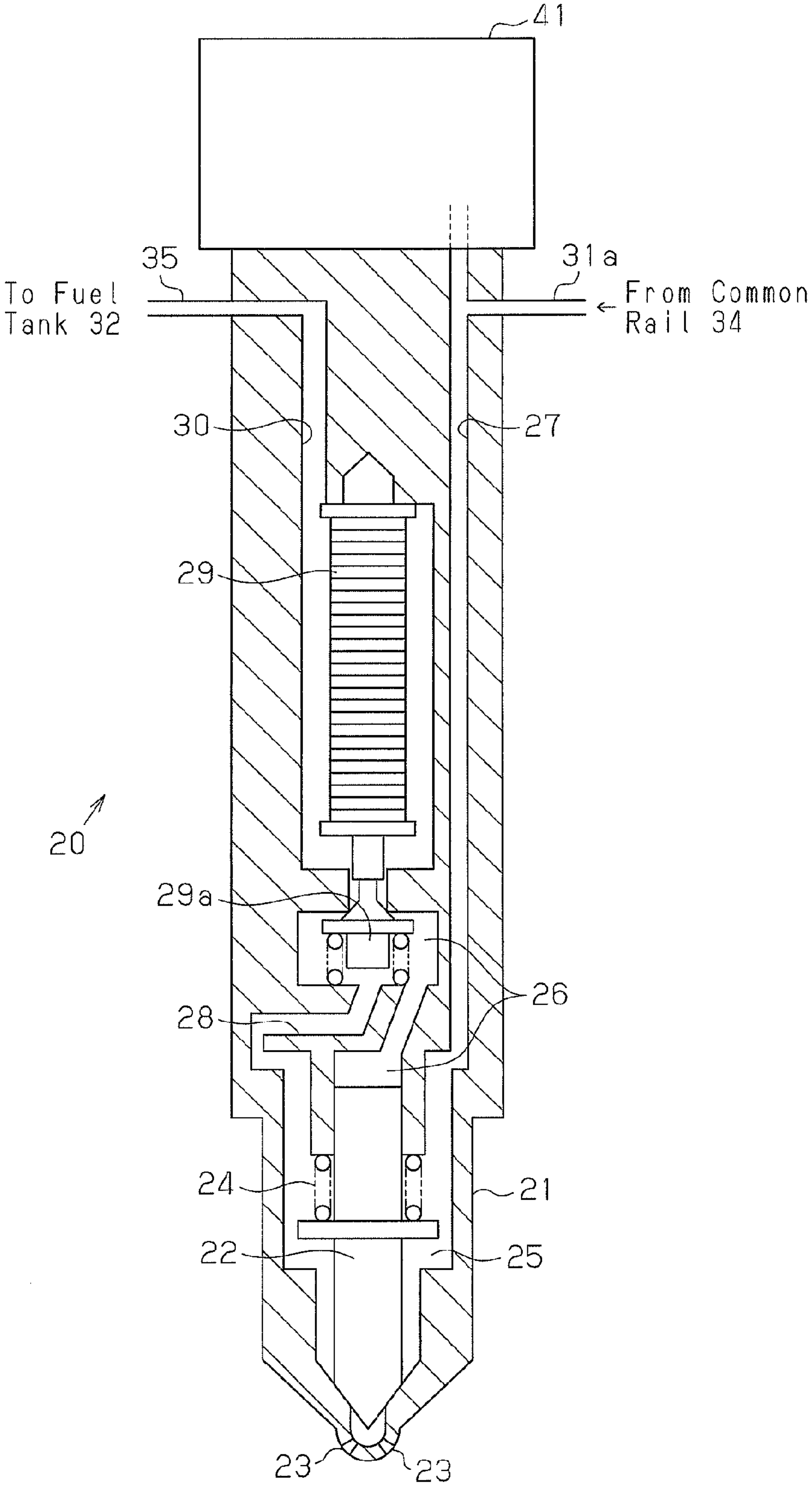
FIG. 2 is a cross-sectional view showing a fuel injection valve illustrated in FIG. 1.

With reference to FIG. 2, the internal configuration of each fuel injection valve will now be described.

As shown in FIG. 2, the fuel injection valve 20 has a housing 21. A needle valve 22 is mounted in the housing 21 in a state reciprocal (movable in the up-and-down direction of the drawing) in the housing 21. A spring 24 constantly urges the needle valve 22 toward an injection hole 23 (located at a lower position in the drawing). In the housing 21, a nozzle chamber 25 is formed at one side (a lower position in the drawing) with respect to the needle valve 22. A pressure chamber 26 is arranged at the opposite side (an upper position in the drawing) with respect to the needle valve 22.

The injection hole 23, which is formed in the nozzle chamber 25, allows communication between the interior of the nozzle chamber 25 and the exterior of the housing 21. Fuel is supplied from the above-described branch line 31*a* (the common rail 34) to the injection hole 23 via an inlet line 27. The nozzle chamber 25 and the branch line 31*a* (the common rail 34) are connected to the pressure chamber 26 through a communication line 28. The pressure chamber 26 is connected to the return line 35 (the fuel tank 32) through a drainage line 30.

Each fuel injection valve 20 is an electrically driven type. Specifically, a piezoelectric actuator 29, on which a piezoelectric element (such as a piezoelectric element) that selectively expands and compresses in response to input of a drive signal is deposited, is arranged in the housing 21. A valve body 29*a* is attached to the piezoelectric actuator 29 and arranged in the pressure chamber 26. As the valve body 29*a* moves through actuation of the piezoelectric actuator 29, one of the communication line 28 (the nozzle chamber 25) and the drainage line 30 (the return line 35) is selectively caused to communicate with the pressure chamber 26.

In the fuel injection valve 20, when a valve closing signal is input to the piezoelectric actuator 29, the piezoelectric actuator 29 compresses to move the valve body 29*a*, thus permitting communication between the communication line 28 and the pressure chamber 26 and prohibiting communication between the return line 35 and the pressure chamber 26. In this manner, the nozzle chamber 25 communicates with the pressure chamber 26, with fuel drainage from the pressure chamber 26 to the return line 35 (the fuel tank 32) prohibited. The difference between the pressure in the nozzle chamber 25 and the pressure in the pressure chamber 26 thus becomes extremely small, thus causing the urging force of the spring 24 to move the needle valve 22 to the position for closing the injection hole 23. At this stage, the fuel injection valve 20 is held in a non-fuel-injecting state (a closed state).

In contrast, when a valve opening signal is input to the piezoelectric actuator 29, the piezoelectric actuator 29 expands to move the valve body 29*a*, thus prohibiting communication between the communication line 28 and the pressure chamber 26 and permitting communication between the return line 35 and the pressure chamber 26. As a result, some of the fuel in the pressure chamber 26 is returned to the fuel tank 32 through the return line 35, with a fuel flow from the nozzle chamber 25 to the pressure chamber 26 prohibited. This decreases the pressure of the fuel in the pressure chamber 26. The difference between the pressure in the pressure chamber 26 and the pressure in the nozzle chamber 25 thus becomes great. This moves the needle valve 22 against the urging force of the spring 24 to move away from the injection hole 23. At this stage, the fuel injection valve 20 is held in a fuel injecting state (an open state).

A fuel sensor 41 is attached integrally to each fuel injection valve 20 to output a signal corresponding to the fuel pressure PQ in the inlet line 27. Accordingly, compared to a case detecting fuel pressure at a position spaced from the fuel injection valve 20, such as a position in the common rail 34 (see FIG. 1), the fuel pressure is detected at a position close to the injection hole 23 of the fuel injection valve 20. As a result, a change in the fuel pressure in the fuel injection valve 20 caused through opening of the fuel injection valve 20 is detected accurately. The fuel sensor 41 functions as not only a pressure sensor but also a temperature sensor for detecting the fuel temperature (THQ) in the inlet line 27. The functions of the fuel sensor 41 are switched in response to a signal input from an electronic control unit 40 serving as a pressure correcting section and a temperature correcting section, which will be described later. The fuel sensors 41 are mounted in correspondence with the respective fuel injection valves 20, or, in other words, the respective cylinders 11 of the diesel engine 10.

As illustrated in FIG. 1, the diesel engine 10 includes various sensors for detecting operating states of the engine 10 as peripheral devices. In addition to the above-described fuel sensor 41, the sensors include a supercharging pressure sensor 42 for detecting the pressure in a downstream section of the intake passage 12 with respect to the compressor 17 in an intake air flow direction (the supercharging pressure PA) and a crank sensor 43 for detecting the rotation phase (the crank angle CA) and the rotating speed of the crankshaft 14 (the engine speed NE). The sensors also include a coolant temperature sensor 44 for detecting the temperature of coolant (THW) in the diesel engine 10, a storage amount sensor 45 for detecting the amount of fuel stored in the fuel tank 32, an accelerator sensor 46 for detecting the operating amount (the accelerator operating amount ACC) of an accelerating member (for example, an accelerator pedal), and a vehicle speed sensor 47 for detecting the traveling speed of a vehicle.

The diesel engine 10 also has an electronic control unit 40 having a microcomputer, for example, as a peripheral device. The electronic control unit 40 receives output signals from the sensors and performs various types of calculations based on the output signals. In correspondence with results of the calculations, the electronic control unit 40 carries out various types of control related to operation of the diesel engine 10, such as operation control for the fuel injection valves 20 (fuel injection control).

In the first embodiment, the fuel injection control is typically executed in the manner described below.

First, the control target value (the target injection amount TAU) for the fuel injection amount in engine operation is calculated based on the accelerator operating amount ACC, the engine speed NE, and the fuel cetane number (specifically, an estimated cetane number, which will be described later). Then, the target control value for the timing for initiating fuel injection (the target injection timing Tst) and the target control value for the fuel injection time (the target injection time Ttm) are calculated based on the target injection amount TAU and the engine speed NE. Using the obtained target injection timing Tst and target injection time Ttm, opening of each fuel injection valve 20 is controlled. In this manner, fuel is injected from the fuel injection valves 20 by an amount corresponding to the current operating state of the diesel engine 10 and supplied to the corresponding cylinders 11.

In the first embodiment, in addition to the fuel injection control, operation control (rail pressure control) for the fuel pump 33 is carried out. The rail pressure control is performed to adjust the fuel pressure in the common rail 34 (the rail pressure) in correspondence with the operating state of the diesel engine 10. Specifically, the control target value (the target rail pressure Tpr) for the rail pressure is calculated based on the target injection amount TAU and the engine speed NE. Actuation of the fuel pump 33 is controlled in such a manner that the target rail pressure Tpr and the actual rail pressure become equal to each other. In this manner, the amount of the fuel sent to the common rail 34 under pressure is adjusted.

Also, in the first embodiment, a correction procedure is executed to ensure appropriate fuel injection corresponding to the operating state of the engine 10. In the procedure, a detection time waveform of the fuel injection rate is formed based on the fuel pressure PQ detected by the fuel sensor 41 at the respective time points. The target injection timing Tst and the target injection time Ttm are then corrected using the detection time waveform. The correction procedure is performed for each of the cylinders 11 separately. The correction procedure will hereafter be described in detail.

The fuel pressure in each fuel injection valve 20 is decreased by opening the fuel injection valve 20 and then increased by closing the fuel injection valve 20. That is, the fuel pressure in each fuel injection valve 20 is varied by selectively opening and closing the fuel injection valve 20. Accordingly, by monitoring a variation waveform of the fuel pressure at the time of fuel injection, the actual operating characteristics of the fuel injection valve 20 (including, for example, the point in time at which valve opening or closing is started) are accurately acknowledged.

Hereinafter, a procedure for forming the variation waveform of the fuel pressure at the time of fuel injection (in the first embodiment, the detection time waveform of the fuel injection rate) will be described.

Figure 3:
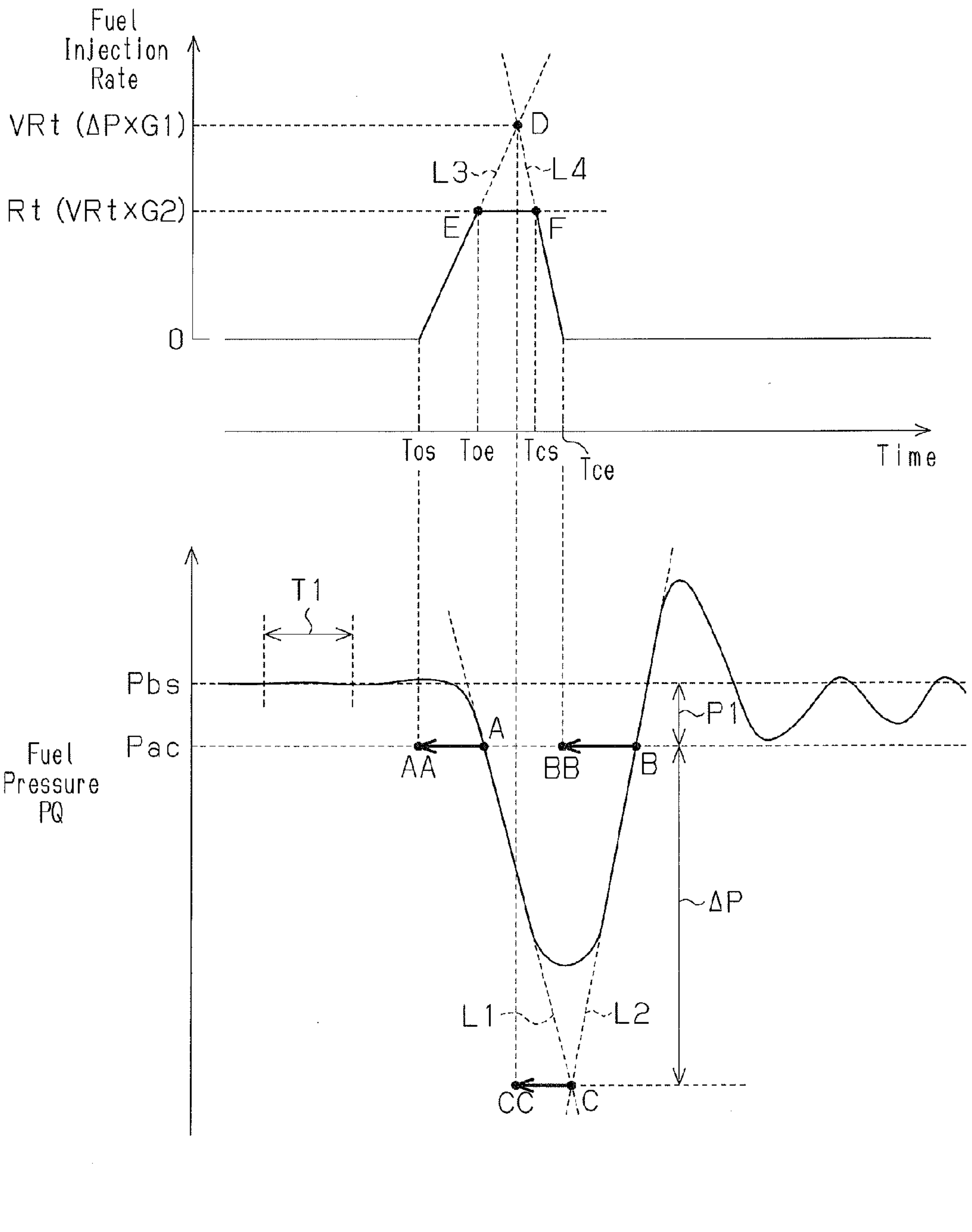
FIG. 3 is a timing chart representing the relationship between variation in fuel pressure and a detection time waveform of a fuel injection rate.

FIG. 3 represents the relationship between variation in the fuel pressure PQ and the detection time waveform of the fuel injection rate.

Referring to FIG. 3, in the first embodiment, the valve opening starting timing Tos at which opening of each fuel injection valve 20 is started, the injection rate maximizing timing Toe at which the fuel injection rate is maximized, the injection rate decrease starting timing Tcs at which the fuel injection rate starts to drop, and the valve closing completing timing Tce at which closing of the fuel injection valve 20 is completed are detected. Specifically, opening and closing of each fuel injection valve 20 correspond to movement of the needle valve 22 in the opening direction and the closing direction, respectively.

First, the average of the fuel pressure PQ in the predetermined period T1 immediately before the fuel injection valve 20 starts to open is calculated. The average is memorized as a reference pressure Pbs, which corresponds to the fuel pressure in the fuel injection valve 20 at the time when the fuel injection valve 20 is closed.

Then, the predetermined pressure P1 is subtracted from the reference pressure Pb to obtain the operating pressure Pac (Pac=Pbs−P1). The predetermined pressure P1 is the pressure corresponding to the change amount of the fuel pressure PQ at the time when the fuel pressure PQ changes despite that the needle valve 22 is maintained at a closing position when the fuel injection valve 20 is opening or closing, which is the change amount of the fuel pressure PQ that does not contribute to movement of the needle valve 22.

Afterwards, the first order differential value of the fuel pressure PQ in the period in which the fuel pressure PQ drops due to initiation of valve opening immediately after fuel injection is started is calculated. The tangent line L1 of the time waveform of the fuel pressure PQ at the point at which the one time differential value is minimum is then obtained. Further, the intersection point A between the tangent line L1 and the line representing the operating pressure Pac is calculated. The point in time corresponding to the point AA, which is obtained by displacing the intersection point A in the direction into the past by an amount corresponding to detection delay in the fuel pressure PQ, is identified as the valve opening starting timing Tos. The detection delay is the period corresponding to delay of change in the fuel pressure PQ with respect to change in the pressure in the nozzle chamber 25 (see FIG. 2) of the fuel injection valve 20. The detection delay is caused by, for example, the distance between the nozzle chamber 25 and the fuel sensor 41.

Subsequently, the first order differential value of the fuel pressure PQ in the period in which the fuel pressure PQ rises due to initiation of valve closing immediately after the above-described period in which the fuel pressure PQ decreases is calculated. The tangent line L2 of the time waveform of the fuel pressure PQ at the point at which the one time differential value is maximum is then obtained. Further, the intersection point B between the tangent line L2 and the line representing the operating pressure Pac is calculated. The point in time corresponding to the point BB, which is obtained by displacing the intersection point B in the direction into the past by the amount corresponding to the detection delay, is identified as the valve closing starting timing Tce.

Further, the intersection point C between the tangent line L1 and the tangent line L2 is determined. The difference between the fuel pressure PQ and the operating pressure Pac at the intersection point C (the hypothetical pressure decrease $\Delta P[\Delta P = Pac - PQ]$) is then calculated. The hypothetical pressure decrease ΔP is multiplied by the gain G1, which is set based on the target injection amount TAU and the target rail pressure Tpr, to obtain the hypothetical maximum fuel injection rate VRt ($VRt = \Delta P \times G1$). The hypothetical maximum fuel injection rate VRt is then multiplied by the gain G2, which is set based on the target injection amount TAU and the target rail pressure Tpr, to determine the maximum injection rate Rt ($Rt = VRt \times G2$).

Afterwards, the point CC, which is obtained by displacing the intersection point C in the delaying direction by the amount corresponding to the detection delay, is calculated. Further, the point D is identified based on the hypothesis that the fuel injection rate becomes equal to the hypothetical maximum fuel injection rate VRt at the point in time corresponding to the point CC. The point in time corresponding to the intersection point E between the line L3, which extends between the point D and the valve opening starting timing Tos (which is, specifically, the point at which the fuel injection rate becomes zero at the timing Tos), and the line representing the maximum fuel injection rate Rt is identified as the injection rate maximizing timing Toe.

The point in time corresponding to the intersection point F between the line 4, which extends between the point D and the valve closing completing timing Tce (which is, specifically, the point at which the fuel injection amount becomes zero at the timing Tce), and the line representing the maximum injection rate Rt is identified as the injection rate decrease starting timing Tcs.

The trapezoidal time waveform formed by the section of the line L3 extending from the valve opening starting timing Tos to the injection rate maximizing timing Toe, the section of the line 4 extending from the injection rate decrease starting timing Tcs to the valve closing completing timing Tce, and the section of the line representing the maximum injection rate Rt extending from the injection rate maximizing timing Toe to the injection rate decrease starting timing Tcs is used as the detection time waveform for the fuel injection rate in fuel injection.

Next, with reference to FIGS. 4 to 6, a procedure for correcting various control target values (a correction procedure) using the detection time waveform will be described in detail.

Figure 4:
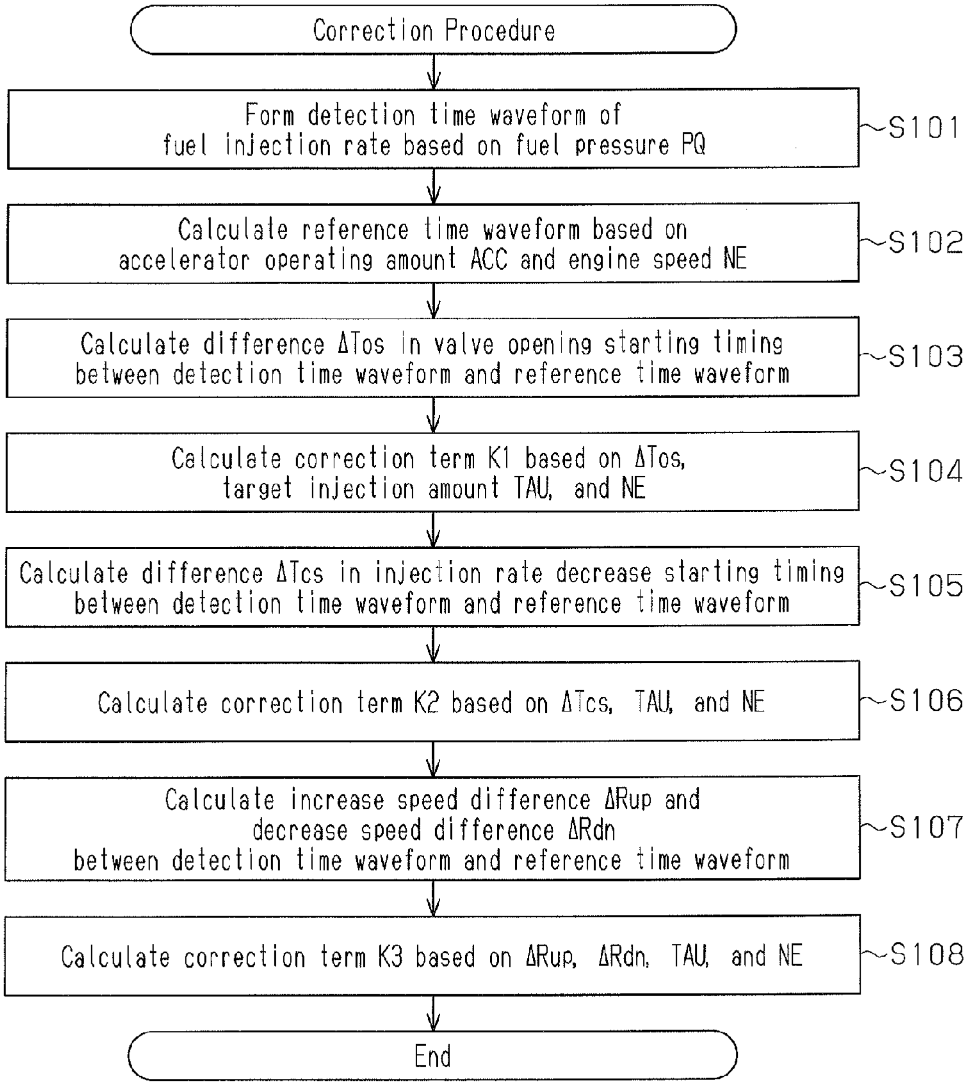
FIG. 4 is a flowchart representing a correction procedure.

FIG. 4 is a flowchart specifically representing the steps of the correction procedure. The series of procedure represented in the flowchart is carried out by the electronic control unit 40 as interrupt processing at predetermined cycles. FIGS. 5 and 6 each represent an example of the relationship between the detection time waveform and a reference time waveform.

Referring to FIG. 4, the procedure is started by forming the detection time waveform of the fuel injection rate in fuel injection based on the fuel pressure PQ (Step S101), as has been described. A reference value (a reference time waveform) for the time waveform of the fuel injection rate in the fuel injection is set based on the operating state of the diesel engine 10, such as the accelerator operating amount ACC and the engine speed NE (Step S102). In the first embodiment, the relationship between the operating state of the diesel engine 10 and the time waveform of the fuel injection rate suitable for the operating state is determined in advance through tests and simulations and stored in the electronic control unit 40. In Step S102, the reference time waveform is set with reference to the above-described relationship, based on the current operating state of the diesel engine 10. In the first embodiment, the detection time waveform serves as actual operating characteristics of the fuel injection valve 20. The reference time waveform serves as prescribed reference operating characteristics.

Figure 5:
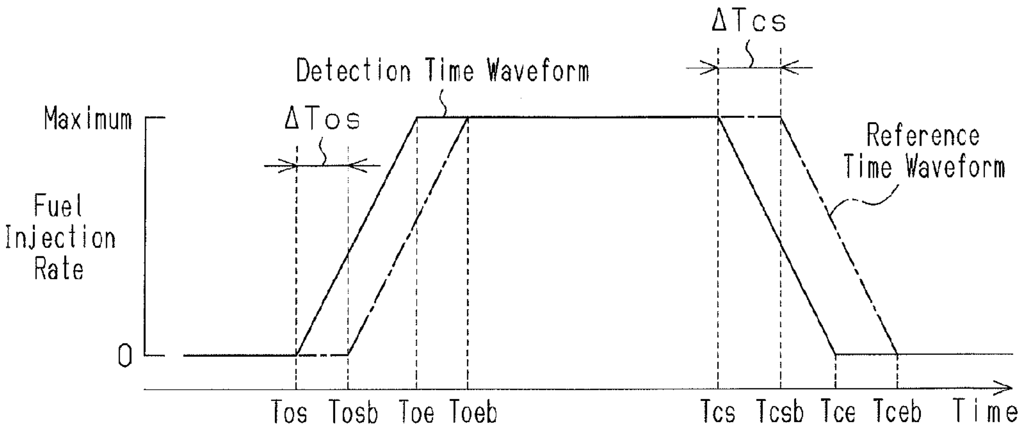
FIG. 5 is a timing chart representing an example of the relationship between a detection time waveform and a reference time waveform.

With reference to FIG. 5, the reference time waveform (represented by the single-dashed chain lines) is set to a trapezoidal time waveform that is defined by the path of the fuel injection rate that increases from zero to the maximum fuel injection rate in the period from the valve opening starting timing Tosb to the injection rate maximizing timing Toeb, maintains the maximum fuel injection rate in the period from the injection rate maximizing timing Toeb to the injection rate decrease starting timing Tcsb, and decreases from the maximum fuel injection rate to zero in the period from the injection rate decrease starting timing Tcsb to the valve closing completing timing Tceb.

The reference time waveform and the aforementioned detection time waveform (represented by the solid lines) are compared with each other. Based on the result of comparison, the correction term K1 for correcting the control target value of the fuel injection starting timing (the target injection timing Tst) and the correction terms K2 and K3 for correcting the control target value of the fuel injection time (the target injection time Ttm) are determined.

Specifically, the difference ΔTos between the valve opening starting timing Tosb for the reference time waveform and the valve opening starting timing Tos for the detection time waveform is calculated (Step S103 in FIG. 4). The correction term K1 is then determined using the difference ΔTos, the target injection amount TAU, and the engine speed NE and memorized (Step S104). In the first embodiment, the relationship between the circumstance defined by the difference ΔTos, the target injection amount TAU, and the engine speed NE and the correction term K1 capable of accurately correcting the difference ΔTos under this circumstance is determined in advance through tests and simulations and stored in the electronic control unit 40. In Step S104, the correction term K1 is calculated based on the relationship.

Further, the difference ΔTcs between the injection rate decrease starting timing Tcsb (FIG. 5) for the reference time waveform and the injection rate decrease starting timing Tcs for the detection time waveform is calculated (Step S104 in FIG. 4). The correction term K2 is then calculated based on the difference ΔTcs, the target injection amount TAU, and the engine speed NE and memorized (Step S106). In the first embodiment, the relationship among the circumstance defined by the difference ΔTcs, the target injection amount TAU, and the engine speed NE and the correction term K2 capable of accurately correcting the difference ΔTcs under this circumstance is determined in advance through tests and simulations and stored in the electronic control unit 40. In Step S106, the correction term K2 is calculated based on the relationship.

Figure 6:
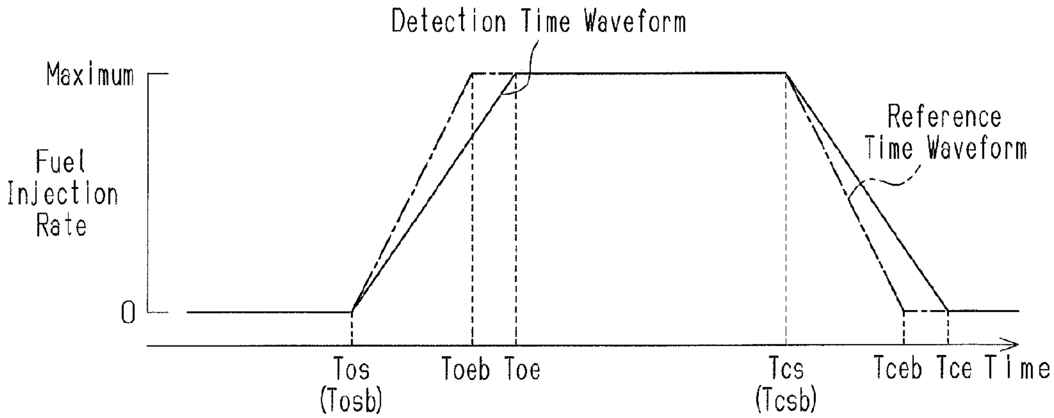
FIG. 6 is another timing chart representing an example of the relationship between the detection time waveform and the reference time waveform.

With reference to FIG. 6, to calculate the correction term K3, the difference in the change speed of the fuel injection rate between the reference time waveform (indicated by the single-dashed chain lines) and the detection time waveform (indicated by the solid lines) is determined (Step S107). Specifically, the difference ΔRup between the inclination of the line extending between the valve opening starting timing Tos and the injection rate maximizing timing Toe and the inclination of the line extending between the valve opening starting timing Tosb and the injection rate maximizing timing Toeb is calculated as the difference in the increase speed of the fuel injection rate. Similarly, the difference ΔRdn between the inclination of the line extending between the injection rate decrease starting timing Tcs and the valve closing completing timing Tce and the inclination of the line extending between the injection rate decrease starting point in time Tcsb and the valve closing completing point in time Tceb is calculated as the difference in the decrease speed of the fuel injection rate. The differences ΔRup, ΔRdn are in high correlation with the difference in the surface area between the reference time waveform and the detection time waveform. Specifically, the surface area of each of the time waveforms is the surface area of the range defined by the time waveform and the line representing that the fuel injection rate is zero. The correction term K3 is calculated based on the differences ΔRup and ΔRdn, the target injection amount TAU, and the engine speed NE and memorized (Step S108). In the first embodiment, the relationship among the circumstance defined by the difference ΔRup and ΔRdn, the target injection amount TAU, and the engine speed NE and the correction term K3 capable of accurately correcting the difference in the fuel injection amount corresponding to the surface area difference between the reference time waveform and the detection time waveform under this circumstance is determined in advance through tests and simulations and stored in the electronic control unit 40. In Step S108, the correction term K3 is calculated based on the relationship.

After the correction terms K1, K2, K3 are corrected in the above-described manners, the procedure is suspended.

In execution of the fuel injection control, the final target injection timing Tst is determined by correcting the target injection timing Tst with the correction term K1 (in the first embodiment, by adding the correction term K1 to the target injection timing Tst). By obtaining the target injection timing Tst in this manner, the difference between the valve opening starting point in time Tosb for the reference time waveform and the valve opening starting timing Tosb for the detection time waveform is canceled. As a result, the point in time for starting fuel injection is accurately set in correspondence with the operating state of the diesel engine 10.

The final target injection time Ttm is determined by correcting the target injection time Ttm with the aforementioned correction terms K2, K3 (in the first embodiment, by adding the correction terms K2, K3 to the target injection time Ttm). By obtaining the target injection time Ttm in this manner, the difference between the injection rate decrease starting timing Tcsb for the reference time waveform and the injection rate decrease starting timing Tcs for the detection time waveform is canceled. As a result, the point in time for starting decrease of the fuel injection rate in fuel injection is accurately set in correspondence with the operating state of the diesel engine 10.

In the first embodiment, the target injection timing Tst and the target injection time Ttm are corrected based on the difference between the actual operating characteristics (specifically, the detection time waveform) of each fuel injection valve 20 and the prescribed reference operating characteristics (specifically, the reference time waveform). This cancels the difference between the actual operating characteristics and the reference operating characteristics (the operating characteristics of a standard fuel injection valve) in each fuel injection valve 20. In this manner, the point in time for starting fuel injection and the injection time are both set appropriately in correspondence with the operating state of the diesel engine 10.

If the valve opening starting timing and the injection rate decrease starting timing in the reference time waveform coincide with the corresponding points in time in the detection time waveform but the two time waveforms have different increase or decrease speeds of the fuel injection rate, the surface area of the reference time waveform and the surface area of the detection time waveform do not match each other, thus making it likely that the fuel injection amount becomes different from the amount corresponding to the operating state of the diesel engine 10. However, in the first embodiment, the difference in the surface area between the reference time waveform and the detection time waveform is canceled through correction using the correction term K3. As a result, the fuel injection amount is accurately adjusted to the amount corresponding to the operating state of the diesel engine 10.

Further, as has been described, in the apparatus of the first embodiment, the rail pressure control is performed to adjust the fuel pressure in the common rail 34 (the rail pressure) in correspondence with the operating state of the diesel engine 10. Specifically, even if the target injection timing Tst or the target injection time Ttm is changed by a constant amount, the change amount of the valve opening starting timing or the injection rate decrease starting timing varies in correspondence with the rail pressure. In the first embodiment, the rail pressure (which is, in other words, the target injection amount TAU and the engine speed NE, which are the parameters for calculating the target rail pressure Tpr) is employed as a parameter for obtaining the correction terms K1, K2, K3. As a result, the correction terms K1, K2, K3 are appropriately calculated in correspondence with the current rail pressure.

The apparatus of the first embodiment carries out control for estimating the cetane number of fuel (estimation control).

The estimation control is executed typically in the manner described below. First, when an executing condition is satisfied, fuel is injected by a predetermined certain amount (for example, several cube millimeters) and an indicator value for output torque of the diesel engine 10 produced through fuel injection (an engine speed change amount ΣΔNE, which will be described later) is calculated. The cetane number of the fuel is estimated based on the engine speed change amount ΣΔNE. As the cetane number of fuel supplied to the diesel engine 10 becomes greater, the fuel is ignited more easily and leaves less unburned fuel. This increases the output torque generated through combustion of the fuel. In the estimation control of the first embodiment, the cetane number of fuel is estimated based on the relationship between the cetane number of the fuel and the output torque of the diesel engine 10.

Specifically, the output torque of the diesel engine 10 produced through injection of a certain amount of fuel changes in correspondence with not only the cetane number of the fuel but also the engine speed NE for the reason described below.

Figure 7:
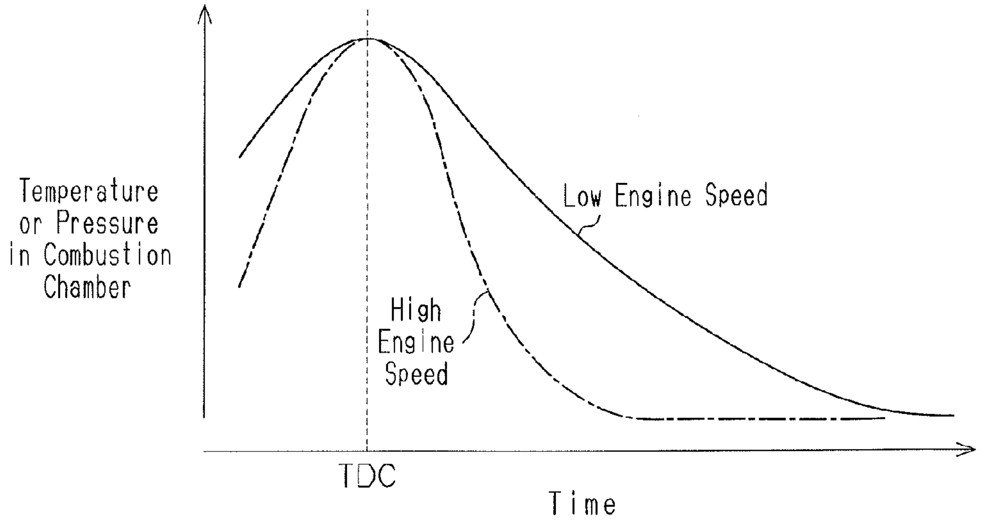
FIG. 7 is a timing chart representing an example of the relationship between the temperature or pressure in a combustion chamber and the engine speed.

FIG. 7 represents an example of the relationship between the temperature (or pressure) in the combustion chamber 11*a* of the diesel engine 10 and the engine speed NE. With reference to FIG. 7, as the engine speed NE increases, the time in which the combustion chamber 11*a* is held under high pressure and at a high temperature decreases. Accordingly, in injection of fuel by a constant amount in the above-described estimation control, as the engine speed NE becomes greater, the point in time at which the temperature and the pressure in the combustion chamber 11*a* drop becomes earlier and more fuel may remain unburned after fuel combustion. As a result, the output torque of the diesel engine 10 produced through the fuel combustion decreases easily.

Figure 8:
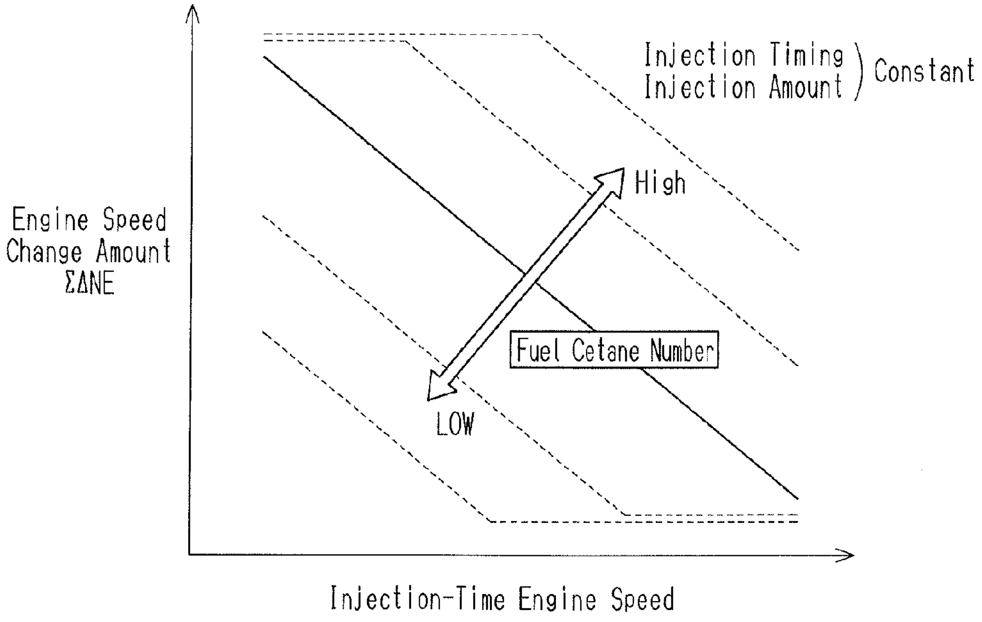
FIG. 8 is a graph representing the relationship among the engine speed change amount, the injection-time engine speed, and the cetane number.

FIG. 8 represents the relationship among the engine speed change amount ΣΔNE, the engine speed NE (the injection timing engine speed), and the cetane number of fuel in a case in which fuel is injected at a constant injection timing by a constant injection amount. As is clear from the graph, in this case, as the injection-time engine speed increases, the output torque of the diesel engine 10 (specifically, the engine speed change amount ΣΔNE, which is an indicator value of the engine output torque) generally decreases.

The output torque of the diesel engine 10 produced through fuel injection by a constant amount varies in correspondence with not only the fuel cetane number and the engine speed NE but also the fuel injection timing.

Figure 9:
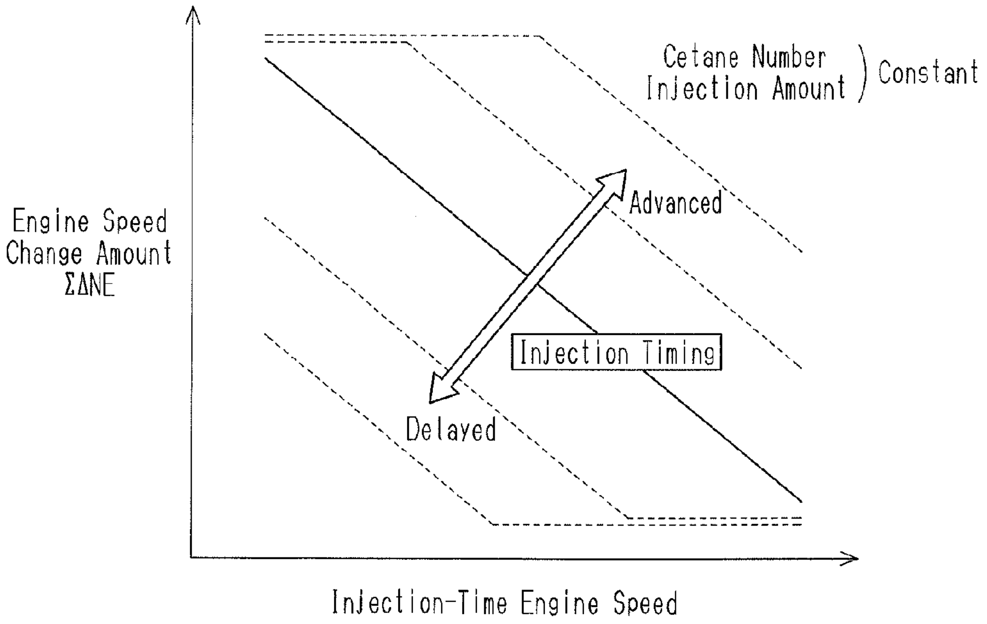
FIG. 9 is a graph representing the relationship among the engine speed change amount, the injection-time engine speed, and the fuel injection timing.

FIG. 9 represents the relationship among the engine speed change amount ΣΔNE, the injection-time engine speed, and the fuel injection timing in a case in which fuel with a constant cetane number is injected by a constant fuel injection amount. As is shown in FIG. 6, as the fuel injection timing becomes more retarded, the output torque of the diesel engine 10 (specifically, the engine speed change amount ΣΔNE, which is an indicator value of the engine output torque) produced through fuel injection generally becomes smaller. Specifically, as the fuel injection timing becomes more delayed, the temperature and the pressure in the combustion chamber 11*a* in which fuel burns become lower, thus increasing the amount of unburned fuel.

As has been described, in the apparatus of the first embodiment, for fuel injection by a constant amount, the output torque of the diesel engine 10 produced through the fuel injection becomes greater as the fuel injection timing becomes more advanced, the engine speed NE at the time of injection becomes lower, and the fuel cetane number becomes higher.

In the first embodiment, with the above-described point taken into consideration, the fuel cetane number is estimated based on the relationship among the engine speed change amount ΣΔNE, the fuel injection timing set through estimation control, and the injection-time engine speed. In this manner, variation of the output torque of the diesel engine 10 caused by variation of the injection-time engine speed and the fuel injection timing is considered in estimation of the fuel cetane number. This improves accuracy for estimating the fuel cetane number.

The estimation control is executed in the manner described in detail below.

The output torque of the diesel engine 10 produced through fuel injection by a constant amount has an upper limit (which is, specifically, the output torque at the time when the amount of fuel remaining unburned is zero). With reference to FIG. 8, the output torque reaches its upper limit in the range in which fuel is injected at a low engine speed NE. Referring to FIG. 9, the output torque reaches the upper limit in the range in which fuel is injected at a comparatively advanced timing. In these circumstances, the output torque is maintained constant at the upper limit regardless of the fuel cetane number. Accordingly, the fuel cetane number cannot be identified based on the output torque (specifically, the engine speed change amount ΣΔNE).

The output torque of the diesel engine 10 produced through fuel injection by a constant amount also has a lower limit (the output torque=zero), in addition to the upper limit. Referring to FIG. 8, the output torque reaches its lower limit in the range in which fuel is injected at a high engine speed NE. With reference to FIG. 9, the output torque reaches its lower limit in the range in which the fuel injection timing is comparatively delayed. In these circumstances, the output torque is maintained constant at the lower limit regardless of the fuel cetane number. Accordingly, the fuel cetane number cannot be identified based on the output torque (specifically, the engine speed change amount ΣΔNE).

As a result, to improve accuracy for estimating the fuel cetane number, it is desirable to perform fuel injection in the estimation control in such a manner as to reduce the size of the range in which the output torque of the diesel engine 10 reaches its upper limit or lower limit.

As is clear from FIG. 9, the range in which the output torque of the diesel engine 10 reaches its upper limit or lower limit is varied by changing the fuel injection timing. With this characteristic taken into consideration, in the estimation control of the second embodiment, the control target value for the fuel injection timing (the target fuel injection timing TQsta) is set based on the engine speed NE and fuel is injected at the target fuel injection timing TQsta. Specifically, the target fuel injection timing TQsta is set to a value more advanced as the engine speed NE becomes greater. By setting the target fuel injection timing TQsta in this manner, the advantages described below are brought about.

When the injection-time engine speed is great, or, in other words, the decrease speed of the pressure and temperature in the combustion chamber 11*a* after fuel combustion are great, fuel injection is carried out at an early stage. The pressure and temperature in the combustion chamber 11*a* are thus prevented from dropping to excessively low values with a great amount of fuel remaining unburned. This prevents the amount of fuel remaining unburned from being increased in spite of a sufficiently high fuel cetane number. As a result, the output torque of the diesel engine 10 (specifically, the engine speed change amount ΣΔNE) is prevented from becoming excessively small.

In contrast, when the injection-time engine speed is small, or, in other words, the decrease speed of the pressure and temperature in the combustion chamber 11*a* after fuel combustion are small, fuel injection is carried out at a delayed stage. The injected fuel is thus prevented from being burned with the pressure and temperature in the combustion chamber 11*a* maintained at unnecessarily high values. This prevents the injected fuel from being burned by a full amount regardless of the fuel cetane number. As a result, the output torque of the diesel engine 10 (specifically, the engine speed change amount ΣΔNE) is prevented from becoming excessively great.

As has been described, in the estimation control of the first embodiment, the fuel injection timing (the target fuel injection timing TQsta) is set in correspondence with the engine speed NE in such a manner that fuel is injected in a range in which it is difficult for the output torque of the diesel engine 10 to reach its upper limit or lower limit. This allows the engine speed change amount ΣΔNE to be varied in a comparatively broad range as a function of the fuel cetane number. As a result, the fuel cetane number is estimated with improved accuracy based on the engine speed change amount ΣΔNE.

Even if fuel is injected at a constant injection timing by a constant amount, the time in which each combustion chamber 11*a* of the diesel engine 10 is maintained at a high temperature and a high pressure becomes smaller as the maximum temperature (the peak temperature) or the maximum pressure (the peak pressure) in the combustion chamber 11*a* become lower. This correspondingly decreases the output torque of the diesel engine 10 produced through fuel injection. In the estimation control of the first embodiment, the fuel cetane number is estimated based on an indicator value of the output torque (the engine speed change amount ΣΔNE). As a result, the aforementioned decrease in the output torque may decrease the estimation accuracy for the cetane number.

Accordingly, in the first embodiment, the target fuel injection timing TQsta is set using not only the engine speed NE but also the coolant temperature THW and the supercharging pressure PA as setting parameters. Specifically, the coolant temperature THW is used as an indicator of the peak temperature in the combustion chamber 11*a* of the diesel engine 10. The supercharging pressure PA is used as an indicator of the peak pressure in the combustion chamber 11*a*. As the coolant temperature THW becomes lower, the peak temperature in the combustion chamber 11*a* is determined to be lower. As the supercharging pressure PA becomes lower, the peak pressure in the combustion chamber 11*a* is determined to be lower. In these cases, the target fuel injection timing TQsta is set to a comparatively early timing.

As has been described, the target fuel injection timing TQsta is set in correspondence with the coolant temperature THW and the supercharging pressure PA. Accordingly, as the peak temperature or the peak pressure in the combustion chamber 11*a* of the diesel engine 10 becomes lower, or, in other words, the output torque of the diesel engine 10 produced through fuel injection at a constant injection timing by a constant injection amount becomes smaller, the fuel injection timing becomes more advanced to increase the output torque. As a result, even if the combustion chamber 11*a* is at a different peak temperature or under a different peak pressure in the aforementioned fuel injection, the output torque is prevented from being changed due to the different peak temperature or the difference peak pressure. This ensures accurate estimation of the fuel cetane number based on the indicator of the output torque (the engine speed change amount ΣΔNE).

When the fuel injection valve 20 is to be closed, the needle valve 22 moves to block the injection hole 23 (FIG. 2) through which fuel is being injected. The fuel flowing in the gap between the housing 21 and the needle valve 22 thus functions to hamper movement of the needle valve 22 toward the injection hole 23. Accordingly, as kinematic viscosity of fuel becomes greater, the movement speed of the needle valve 22, which is the closing speed of the fuel injection valve 20, becomes smaller. As a result, even if operation of the fuel injection valve 20 is controlled in such a prescribed manner as to inject fuel by a constant amount, the amount of actually injected fuel varies in correspondence with the kinematic viscosity of the fuel. An error of the actual fuel injection amount caused by such variation in the kinematic viscosity may lower the estimation accuracy for the cetane number in the estimation control.

To solve this problem, in the first embodiment, the target fuel injection amount in the estimation control is (specifically, the target fuel injection timing TQsta and the target fuel injection time TQtma are) corrected using the correction terms K1 to K3, which are calculated in the above-described correction procedure.

In the apparatus of the first embodiment, when the operating speed of the fuel injection valve 20 (specifically, the needle valve 22 of the fuel injection valve 20) changes due to variation in kinematic viscosity of fuel, the changed operating speed is reflected as a change in the variation waveform (which is, specifically, the aforementioned detection time waveform) of the fuel pressure in the fuel injection valve 20 in fuel injection. In the apparatus of the first embodiment, the correction terms K1 to K3 for correcting the detection time waveform to the reference time waveform are calculated based on the difference between the detection time waveform and the reference time waveform through the correction procedure. When the estimation control is performed, the target fuel injection timing TQsta and the target fuel injection time TQtma are corrected using the correction terms K1 to K3. This cancels the difference between the actual operating characteristics (the detection time waveform) and the reference operating characteristics (the reference time waveform) of the fuel injection valve 20 even if the operating speed of the fuel injection valve 20 is changed due to variation in kinematic viscosity of fuel. As a result, an error of the fuel injection amount is prevented from being generated due to the variation in the kinematic viscosity of fuel.

In the first embodiment, the fuel sensor 41, which functions as a pressure sensor, is attached integrally with the fuel injection valve 20. Accordingly, fuel pressure is detected at a position close to the injection hole 23 of the fuel injection valve 20, compared to an apparatus in which fuel pressure is detected by a sensor spaced from the fuel injection valve 20. This improves accuracy for detecting a variation waveform of fuel pressure in the fuel injection valve 20 caused by opening or closing the fuel injection valve 20. Accordingly, the variation waveform of the fuel pressure corresponding to the current fuel kinematic viscosity is detected by the fuel sensor 41. As a result, the target fuel injection amount is corrected appropriately based on the variation waveform.

When the fuel pressure is varied, a variation wave transmits more quickly as fuel has a greater bulk modulus of elasticity. Accordingly, when the fuel sensor 41 detects a changing manner of fuel pressure in the fuel injection valve 20, the time consumed by a variation wave of the fuel pressure caused by opening or closing the fuel injection valve 20 to reach the mounting position of the fuel sensor 41 (the time corresponding to the detection delay) is varied depending on the bulk modulus of elasticity of the fuel. As a result, if the detection time waveform is detected based on the changing manner of the fuel pressure PQ detected by the fuel sensor 41, the detection time waveform is varied in correspondence with the bulk modulus of elasticity of the fuel even when the fuel is injected by a constant amount through the fuel injection valve 20. Accordingly, even if the target fuel injection timing TQsta and the target fuel injection time TQtma are corrected with the correction terms K1 to K3 calculated using the detection time waveform, the actual fuel injection amount is varied in correspondence with the bulk modulus of elasticity of the fuel. An error of the actual fuel injection amount caused by variation in the bulk modulus of elasticity of the fuel may also lower the estimation accuracy for the cetane number in the estimation control, as in the case of an error caused by variation in fuel kinematic viscosity.

Accordingly, in the first embodiment, the fuel sensor 41 detects the fuel temperature THQ immediately before fuel injection is started in the estimation control. A correction term K4*a* is then calculated based on the detected fuel temperature THQ and the target fuel injection amount (which is, specifically, the target fuel injection time TQtma) is corrected using the correction term K4*a*.

Since the bulk modulus of elasticity of fuel is varied as a function of the fuel temperature, an error of the actual fuel injection amount caused by variation in the bulk modulus of elasticity of the fuel is acknowledged accurately based on the fuel temperature. In the first embodiment, the target fuel injection time TQtma is corrected based on the fuel temperature. Accordingly, even if the relationship between the variation waveform of the actual fuel pressure and the variation waveform of the fuel pressure PQ detected by the fuel sensor 41 is varied due to variation in the bulk modulus of elasticity of the fuel, an error of the actual fuel injection amount caused by variation in the relationship is canceled.

Also in the first embodiment, the fuel temperature THQ is detected immediately before fuel injection is started in the estimation control, or, in other words, at a point in time close to the actual fuel injection timing. The detected fuel temperature THQ is used to correct the target fuel injection amount. As a result, the target fuel injection amount is corrected accurately in correspondence with the bulk modulus of elasticity of the actually injected fuel.

Further, in the first embodiment, the fuel sensor 41, which functions as a temperature sensor, is attached integrally with the fuel injection valve 20. Accordingly, a temperature close to the temperature of the actually injected fuel is detected and used to correct the target fuel injection amount in the estimation control, compared to an apparatus in which the fuel temperature is detected by a sensor located at a position spaced from the fuel injection valve 20 (for example, at a position in the fuel tank 32). As a result, the target fuel injection amount is corrected accurately in correspondence with the bulk modulus of elasticity of the actually injected fuel.

In the first embodiment, an error of the injection amount caused by variation in fuel kinematic viscosity is corrected using the correction terms K1 to K3, which are calculated based on the variation waveform of the fuel pressure PQ. An error of the injection amount caused by variation in the bulk modulus of elasticity of fuel is corrected with the correction term K4*a*, which is determined based on the fuel temperature THQ. In other words, the errors are corrected independently from each other. Accordingly, the error in the injection amount caused by the fuel kinematic viscosity and the error in the injection amount caused by the fuel bulk modulus of elasticity are both appropriately corrected. As a result, an accurately adjusted amount of fuel is injected from the fuel injection valve 20 and, using an indicator of the resulting output torque of the diesel engine 10, the fuel cetane number is estimated accurately.

To simplify the control configuration, it would be preferable if it was possible to correct an error of the injection amount caused by variation in fuel kinematic viscosity and an error of the injection amount caused by variation in the volume elasticity coefficient of fuel with a common correction value calculated using a common calculation parameter such as the fuel temperature.

However, as has been described, the inventors confirmed, through a test, that there was no correlation between kinematic viscosity and the bulk modulus of elasticity of fuel. Therefore, if an error caused by the fuel kinematic viscosity and an error caused by the bulk modulus of elasticity are corrected based on a common parameter, it is impossible to correct both errors accurately at one time, which hampers improvement of the estimation accuracy for the fuel cetane number. Further, there may be a case in which the increase amount of the fuel injection error caused by one of the fuel kinematic viscosity and the bulk modulus of elasticity exceeds the decrease amount of the fuel injection error caused by the other. In this case, the estimation accuracy for the fuel cetane number is decreased disadvantageously. As a result, to accurately correct both the error in the injection amount caused by variation in the fuel kinematic viscosity and the error in the injection amount caused by variation in the bulk modulus of elasticity, it is necessary to correct the error factors using independent correction parameters.

In this regard, in the apparatus of the first embodiment, an error in the injection amount caused by variation in fuel kinematic viscosity is corrected based on a variation waveform of the fuel pressure PQ and an error in the injection amount caused by variation in the fuel bulk modulus of elasticity is corrected using the fuel temperature THQ. In other words, the errors in the injection amount are corrected using the separate correction parameters. This ensures appropriate correction of both errors of the injection amount.

A procedure related to the above-described estimation control (an estimation control procedure) will now be described in detail.

Figure 10:
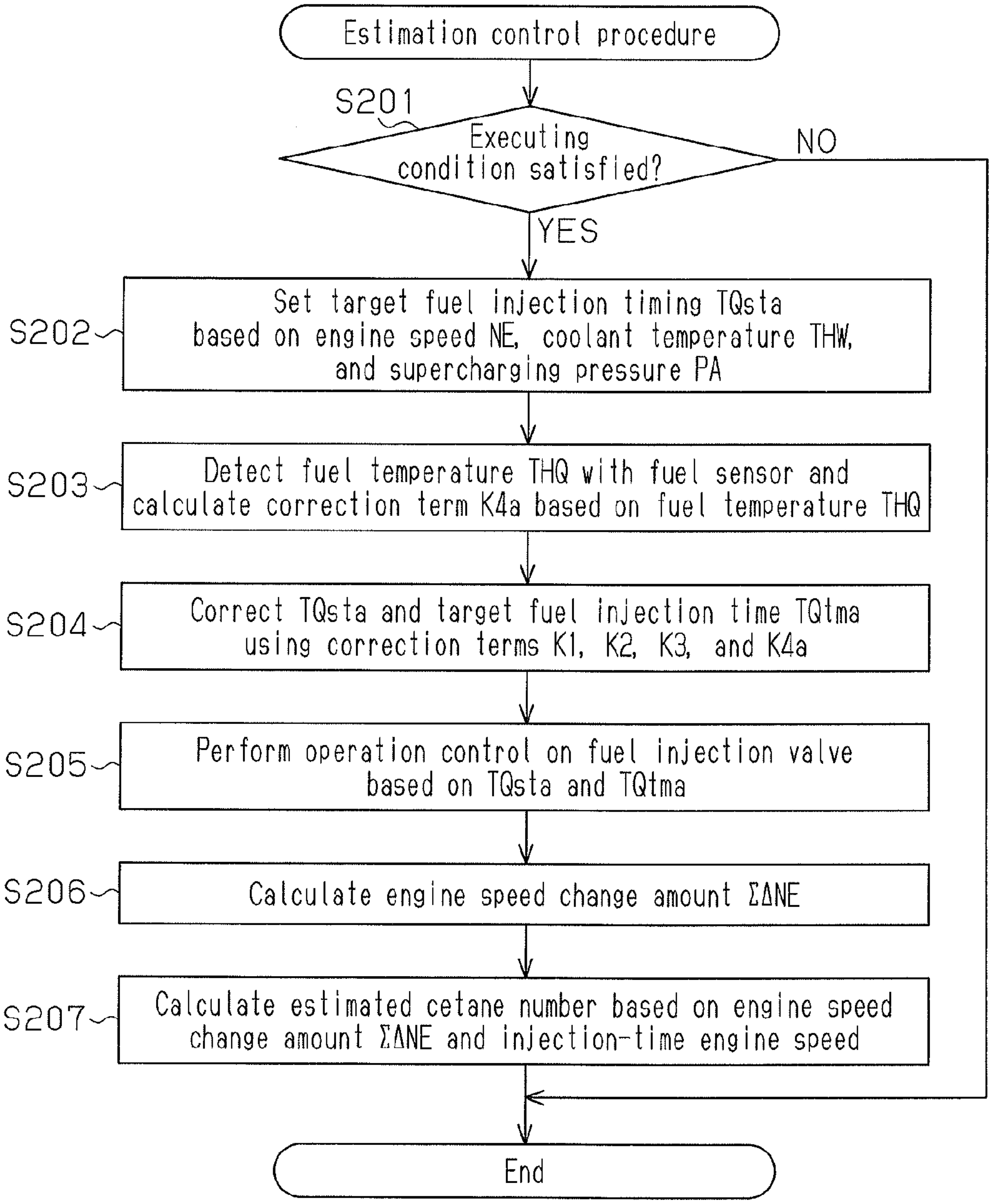
FIG. 10 is a flowchart representing an estimation control procedure according to the first embodiment of the invention.

FIG. 10 is a flowchart specifying the estimation control procedure. The series of procedure in the flowchart schematically represents the estimation control procedure. Actually, the series of procedure in the flowchart is carried out by the electronic control unit 40 as interrupt processing at predetermined cycles.

Referring to FIG. 10, to start the procedure, it is determined whether an executing condition is satisfied (Step S201). Specifically, it is determined that the executing condition is met when the conditions described below, which are [Condition 1], [Condition 2], and [Condition 3], are satisfied.

[Condition 1] That the accelerator operating member has been released and thus the vehicle traveling speed and the engine speed NE are decreasing and that control for temporarily stopping fuel injection for operating the diesel engine 10 (fuel cut control) is being carried out.

[Condition 2] That an estimated value of the fuel cetane number (an estimated cetane number, which will be described later) has not been determined (determination is performed with reference to a calculation history) after it was determined that fuel had been supplied to the fuel tank 32. Specifically, it is determined that fuel supply for the fuel tank 32 has been carried out on condition that a fuel storage amount detected by a storage amount sensor 45 has increased by a predetermined determination amount.

[Condition 3] That, after it was determined that the fuel supply for the fuel tank 32 had been carried out, fuel has been newly supplied from the fuel tank 32 and replaced the fuel in a fuel path connecting the fuel tank 32 to each fuel injection valve 20 (specifically, a path configured by the corresponding branch line 31*a*, the corresponding supply line 31*b*, the common rail 34, and the corresponding return line 35).

Determination of whether [Condition 3] is satisfied is carried out in the manner specified below. That is, every time fuel is injected from each fuel injection valve 20 after it has been determined that fuel was supplied to the fuel tank 32, the amount of the fuel leaking from the interior of the fuel injection valve 20 to the corresponding return line 35 is estimated based on the detection time waveform (see FIGS. 5 and 6) and the characteristics of the fuel injection valve 20. An integrated value of the estimated amounts is then determined. When the integrated value becomes greater than or equal to a predetermined determination amount, it is determined that [Condition 3] is met. In the first embodiment, it is determined whether the fuel in the return line 35 has been replaced by the fuel that was newly fed from the fuel tank 32 after fuel supply for the fuel tank 32 based on the amount of the fuel leaking from inside the fuel injection valve 20 to the return line 35. Based on such determination, it is determined that the fuel in the aforementioned fuel path has been replaced.

The reason for setting [Condition 2] and [Condition 3] is as follows. The cetane number of fuel supplied to the diesel engine 10 may possibly vary to a great extent when fuel supply for the fuel tank 32 is carried out. Accordingly, to estimate the fuel cetane number efficiently at an appropriate time, it is effective to estimate the fuel cetane number when the fuel supply for the fuel tank 32 is performed. However, in a period immediately after the fuel supply for the fuel tank 32, the fuel from before the fuel supply is maintained in the aforementioned fuel paths. Accordingly, even if the above-described fuel injection is performed in this state to estimate the fuel cetane number, the value corresponding to the fuel from after the fuel supply cannot be obtained as the cetane number. In this regard, in the first embodiment, since [Condition 2] and [Condition 3] are set, fuel injection for estimating the cetane number is carried out after the fuel in each fuel path is replaced by the fuel from after the fuel supply for the fuel tank 32 following the fuel supply. This ensures the fuel injection for estimating the fuel cetane number at an appropriate time. As a result, the fuel cetane number is estimated accurately through the fuel injection.

When the executing condition is not satisfied (Step S201: NO), the procedure is suspended without carrying out the following part of the procedure, which is a procedure for estimating the fuel cetane number.

Afterwards, the estimation control procedure is performed repeatedly until the executing condition is satisfied (Step S201: YES). In this state, the target fuel injection timing TQsta is set based on the current engine speed NE, coolant temperature THW, and supercharging pressure PA (Step S202).

Further, the fuel temperature THQ is detected by the fuel sensor 41 and the correction term K4*a* is calculated based on the fuel temperature THQ (Step S203). In this manner, in the estimation control procedure, the fuel temperature THQ is detected by the fuel sensor 41 at a point in time immediately before initiation of fuel injection in the estimation control (which is, specifically, a point in time in the period from when the executing condition is met to when fuel is injected). In detection of the fuel temperature THQ, the fuel sensor 41 is switched temporarily to a state functioning as a temperature sensor in response to a signal input from the electronic control unit 40.

In the first embodiment, the relationship between the fuel temperature THQ and the correction term K4*a*, with which an error in the injection amount caused by variation in the fuel bulk modulus of elasticity is reliably canceled, is determined in advance through tests and simulations and memorized by the electronic control unit 40. In Step S203, the correction term K4*a* is set with reference to the relationship and the fuel temperature THQ.

If the fuel injection valve 20 of the first embodiment is driven in a constant manner, the surface area of the detection time waveform decreases as the fuel temperature, or the fuel bulk modulus of elasticity, increases, possibly for the reason below. As the fuel temperature rises and the fuel bulk modulus of elasticity increases, the speed at which a pressure variation wave transmits in the fuel injection valve 20 increases. This transmits a variation wave of fuel pressure caused by closing the fuel injection valve 20 to the mounting position of the fuel sensor 41 at a comparatively early stage. This increases the increase speed of the fuel pressure PQ detected by the fuel sensor 41 at the time when the fuel injection valve 20 closes. The surface area of the detection time waveform is thus reduced correspondingly. In the first embodiment, to increase the fuel injection amount for each fuel injection valve 20 in the fuel injection control in such a manner as to compensate a decrease in the surface area of the detection time waveform, the target fuel injection amount is (the target fuel injection timing TQsta and the target fuel injection time TQtma are) set to an excessively great value. Accordingly, in Step S203, to prevent the fuel injection amount from being changed due to a change in the fuel temperature, the correction term K4*a* is calculated as such a value that the target fuel injection time TQtam becomes smaller as the fuel temperature THQ becomes higher.

Then, the target fuel injection amount is (the target fuel injection timing TQsta and the target fuel injection time TQtma are) corrected with the correction terms K1 to K3, which have been calculated in the aforementioned correction procedure, and the correction term K4*a* (Step S204). Specifically, the value obtained by adding the correction term K1 to the target fuel injection timing TQsta is set as an update of the target fuel injection timing TQsta. The value obtained by adding the correction terms K2, K3, K4*a* to the target fuel injection time TQtma is set as an update of the target fuel injection time TQtma.

The fuel injection valve 20 is then subjected to operation control based on the updates of the target fuel injection timing TQsta and the target fuel injection time TQtma to inject fuel from the fuel injection valve 20 (Step S205). Fuel injection is carried out by a prescribed one (in the first embodiment, the fuel injection valve 20 attached to the cylinder 11 [#1]) of the fuel injection valves 20. For the correction terms K1 to K3 used in the estimation control procedure, the values that have been calculated correspondence with the prescribed one (in the first embodiment, the fuel injection valve 20 attached to the cylinder 11 [#1]) are employed.

Figure 11:
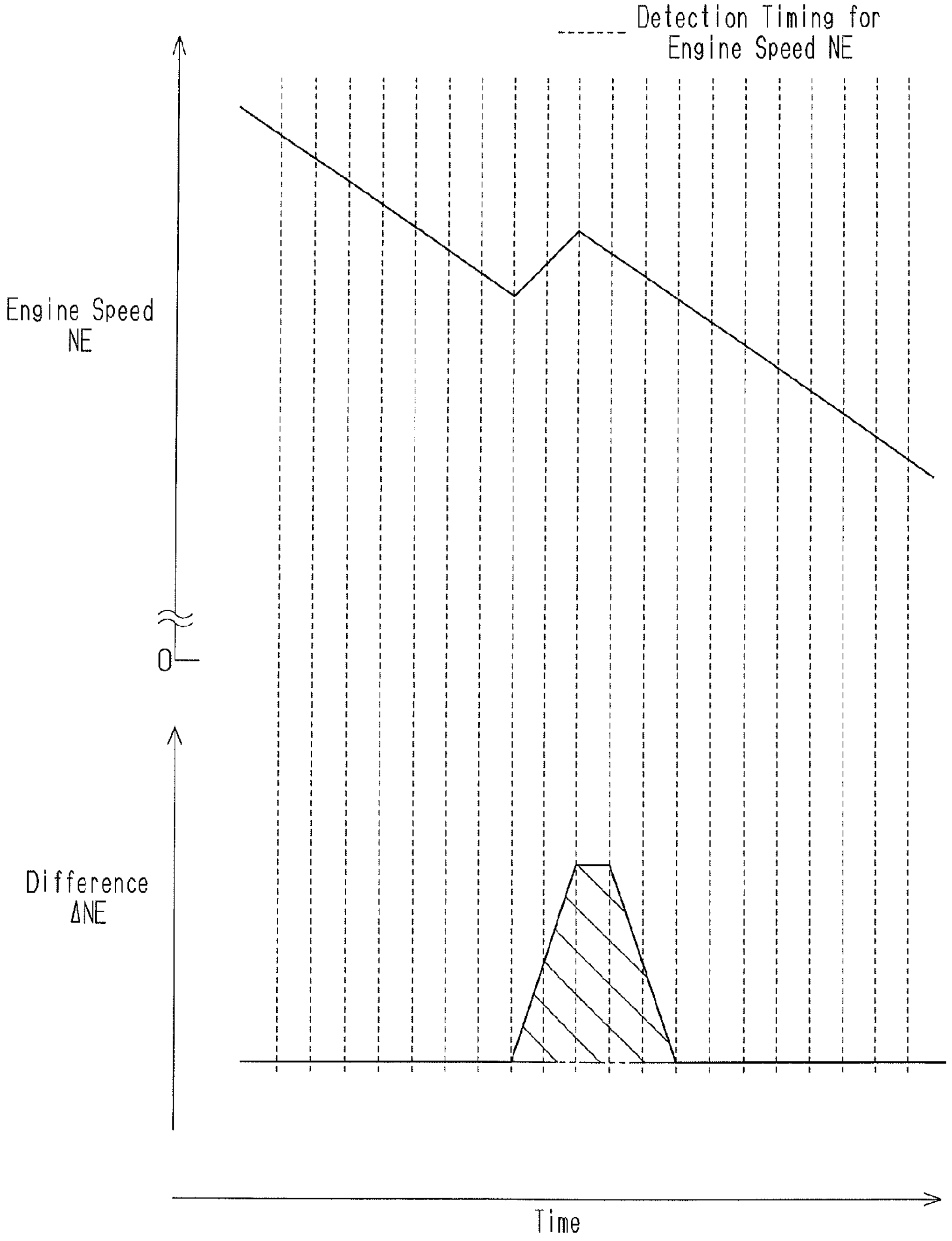
FIG. 11 is a graph representing a method for calculating the engine speed change amount.

Subsequently, the indicator of the output torque of the diesel engine 10 produced through the aforementioned fuel injection (the engine speed change amount ΣΔNE) is calculated (Step S206). Specifically, the engine speed change amount ΣΔNE is determined in the manner described below. With reference to FIG. 11, in the apparatus of the first embodiment, the engine speed NE is detected at predetermined time intervals. For each cycle of detection, the difference ΔNE (ΔNE=NE−NEi) between the engine speed NE and the engine speed NEi that has been detected multiple cycles before (in the first embodiment, three cycles before) is obtained. An integrated value of variation in the difference ΔNE brought about by the fuel injection (the value corresponding to the surface area of the gridded zone in FIG. 11) is then calculated and memorized as the engine speed change amount ΣΔNE. In FIG. 11, variation in the engine speed NE and variation in the difference ΔNE are represented as simplified to facilitate understanding the method for calculating the engine speed change amount ΣΔNE and slightly different from the actual corresponding variations.

Afterwards, an estimated value of the fuel cetane number (the estimated cetane number) is calculated based on the engine speed change amount ΣΔNE and the injection-time engine speed (Step S207 in FIG. 10). In the first embodiment, the relationship among the cetane number that ensures accurate estimation of the fuel cetane number (which is, specifically, the estimated cetane number), the engine speed change amount ΣΔNE, and the injection-time engine speed (the relationship represented in FIG. 8) is determined in advance through tests and simulations and memorized by the electronic control unit 40. In Step S207, the estimated cetane number is calculated based on the engine speed change amount ΣΔNE and the injection-time engine speed, with reference to the aforementioned relationship.

After the estimated cetane number is calculated, the estimation control procedure is suspended.

In the apparatus of the first embodiment, various procedures regarding fuel injection for the respective cylinders are performed independently on the cylinders 11 (#1 to #4) of the diesel engine 10 in response to output signals from the corresponding fuel sensors 41. For example, based on an output signal from the fuel sensor 41 arranged in the cylinder 11 [#1] of the diesel engine 10, various procedures regarding fuel injection for the cylinder 11 [#1] (including the procedure regarding the fuel injection control and the correction procedure) are carried out. Typically, in the diesel engine 10 having the multiple cylinders, the operating characteristics of the fuel injection valves 20 are varied from one cylinder 11 to another due to variation at the initial stage and variation caused by the elapsing time from one product to another. However, despite such variation among the cylinders 11, the amount of the fuel injected from each fuel injection valve 20 is accurately adjusted based on the fuel pressure PQ detected by the corresponding fuel sensor 41, which is arranged exclusively for the associated cylinder 11.

Additionally, using one (in the first embodiment, the fuel injection valve 20 corresponding to the cylinder 11 [#1]), fuel injection in the estimation control is executed based on the correction terms K1 to K3, which are calculated in the fuel injection control of the fuel injection valve 20. This accurately adjusts the amount of the fuel actually injected in the estimation control. As a result, the fuel cetane number is accurately estimated based on the output torque of the diesel engine 10 produced through the fuel injection.

As has been described, the first embodiment has the advantages described below.

(1) The target fuel injection amount for fuel injection in the estimation control is corrected using the variation waveform of the fuel pressure PQ, which is detected by the fuel sensor 41, and the fuel temperature THQ, which is also detected by the fuel sensor 41. Accordingly, even if the operating speed of each fuel injection valve 20 is varied by variation in kinematic viscosity of fuel, the difference between the actual operating characteristics and the reference operating characteristics of the fuel injection valve 20 is canceled. This prevents an error in the injection amount from being caused by the variation in the kinematic viscosity of the fuel. Further, even when the relationship between the variation waveform of the actual fuel pressure and the variation waveform of the fuel pressure PQ detected by the fuel sensor 41 is varied by variation in the bulk modulus of elasticity of the fuel, an error in the actual fuel injection amount is prevented from being caused by the varied relationship. As a result, fuel is injected from the fuel injection valve 20 by an accurately adjusted amount and the fuel cetane number is accurately estimated based on the indicator of the output of the diesel engine 10, which is obtained as a result of fuel injection by the accurately adjusted amount.

(2) The target fuel injection timing TQsta and the target fuel injection time TQtma are corrected with the correction terms K1 to K3, which are determined based on the difference between the detection time waveform and the reference time waveform. Accordingly, even when the operating speed of each fuel injection valve 20 is varied by variation in kinematic viscosity of fuel, the difference between the actual operating characteristics and the reference operating characteristics of the fuel injection valve 20 is canceled. This prevents an error in the injection amount from being caused by the variation in the kinematic viscosity of fuel.

(3) The fuel sensor 41, which functions as a temperature sensor, is attached integrally with each fuel injection valve 20. As a result, a temperature close to the temperature of actually injected fuel is detected and used to correct the target fuel injection amount in the estimation control. This ensures accurate correction of the target fuel injection amount in correspondence with the bulk modulus of elasticity of the actually injected fuel.

(4) The fuel temperature THQ is detected immediately before initiation of fuel injection in the estimation control. The detected temperature THQ is used to correct the target fuel injection amount. As a result, the target fuel injection amount is accurately corrected in correspondence with the bulk modulus of elasticity of the actually injected fuel.

(5) The fuel sensor 41, which functions as a pressure sensor, is attached integrally with each fuel injection valve 20. The fuel sensor 41 thus detects a variation waveform corresponding to current kinematic viscosity of fuel. This ensures appropriate correction of the target fuel injection amount based on the variation waveform.

Second Embodiment

A cetane number estimation apparatus according to a second embodiment of the present invention will now be described mainly about differences between the first embodiment and the second embodiment. Hereinafter, same or like reference numerals are given to components of the second embodiment that are the same as or like corresponding components of the first embodiment. Detailed description of these components is omitted herein.

The cetane number estimation apparatus of the second embodiment is different from the cetane number estimation apparatus of the first embodiment in how the estimation control is performed to estimate the cetane number of fuel.

The estimation control of the second embodiment will hereafter be described specifically.

As described above, when fuel is injected at a constant injection timing by a constant injection amount, the relationship among the engine speed NE at the time of injection (the injection-time engine speed), the engine speed change amount ΣΔNE, and the fuel cetane number exhibits the tendencies described below. Specifically, as is clearly represented in FIG. 12, as the injection-time engine speed becomes greater, the engine speed change amount ΣΔNE becomes generally smaller. Further, the output torque of the diesel engine 10 produced through fuel injection at a constant timing by a constant injection amount has an upper limit (which is, specifically, the output torque at the time when the amount of unburned torque after combustion is zero). Accordingly, if fuel is injected in such a condition that the output torque becomes its upper limit, the output torque reaches its upper limit regardless of the fuel cetane number. The output torque also has a lower limit (the output torque=zero). Accordingly, when fuel is injected in such a condition that the output torque becomes its lower limit, the output torque reaches its lower limit regardless of the fuel cetane number.

When fuel is injected at a constant injection timing in a plurality of conditions having different engine speeds NE and the relationship between the injection-time engine speed and the engine speed change amount ΣΔNE is determined, the relationship exhibits the tendencies described below in correspondence with the cetane number of the fuel. Specifically, the boundary (specifically, the value corresponding to the injection-time engine speed indicated by the line L5 in FIG. 12) between the range in which the engine speed change amount ΣΔNE is maintained substantially constant at the upper limit regardless of the injection-time engine speed and the range in which the engine speed change amount ΣΔNE varies depending on the injection-time engine speed changes in correspondence with the fuel cetane number. Also, the boundary (specifically, the value corresponding to the injection-time engine speed indicated by the line L6 in FIG. 12) between the range in which the engine speed change amount ΣΔNE varies depending on the injection-time engine speed and the range in which the engine speed change amount ΣΔNE is maintained substantially constant at the lower limit regardless of the injection-time engine speed changes in correspondence with the fuel cetane number.

The second embodiment is focused on the above-described tendencies. That is, as to the relationship between the injection-time engine speed and the engine speed change amount ΣΔNE, the boundaries (which are, specifically, the lines L5, L6) each between the two ranges in which the engine speed change amount ΣΔNE varies in different manners with respect to variation in the injection-time engine speed is identified. The fuel cetane number is estimated using the boundaries. This ensures accurate estimation of the fuel cetane number based on the relationship between the injection-time engine speed and the engine speed change amount ΣΔNE (specifically, the boundaries), which varies depending on the engine cetane number.

The estimation control procedure of the second embodiment will hereafter be described.

Figure 13:
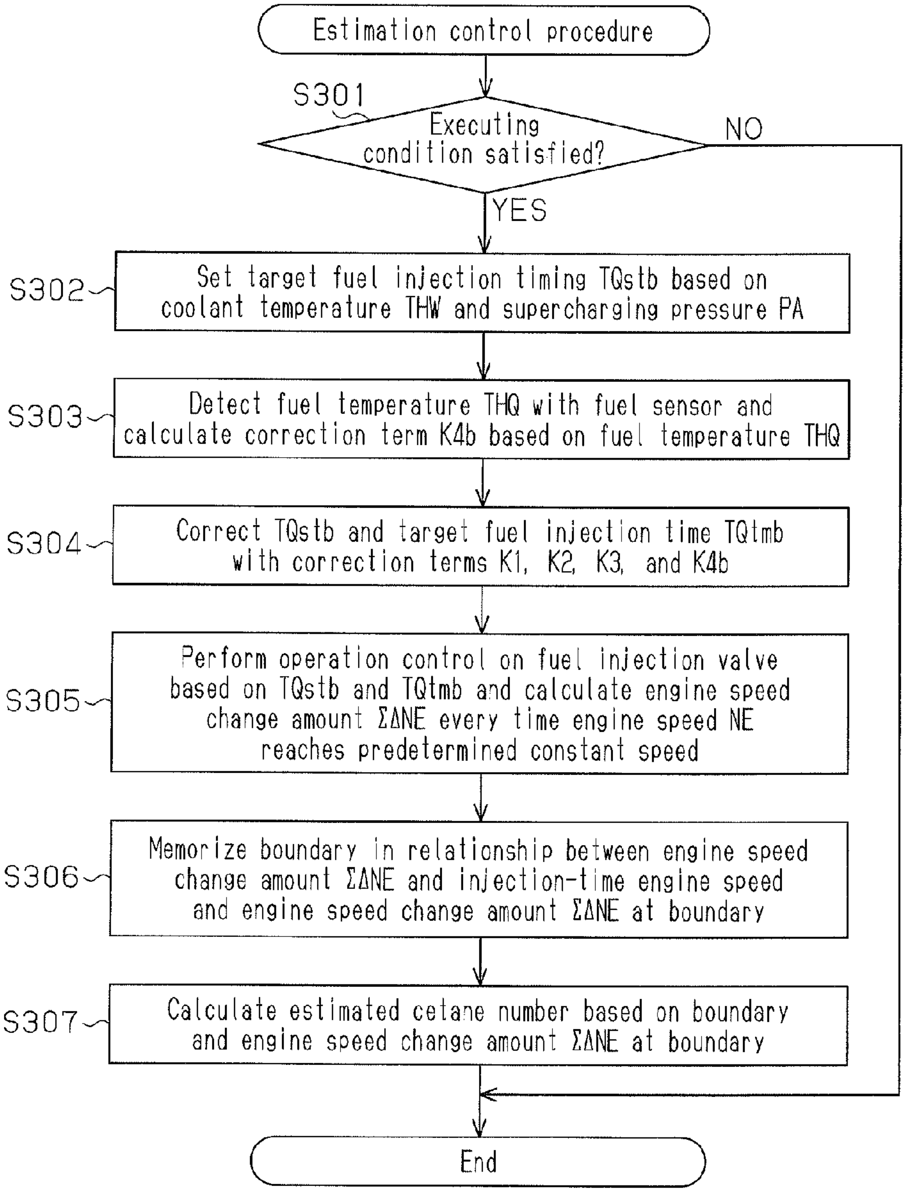
FIG. 13 is a flowchart representing an estimation control procedure according to a second embodiment of the present invention.

FIG. 13 is a flowchart specifying the estimation control procedure. The series of procedure in the flowchart schematically represents the estimation control procedure. Actually, the series of procedure in the flowchart is carried out by the electronic control unit 40 at predetermined time intervals as interrupt processing.

With reference to FIG. 13, the procedure is started by determining whether an executing condition is satisfied (Step S301). Specifically, it is determined that the executing condition is satisfied if the above-described conditions, which are [Conditions 1 to 3], are all met.

In the second embodiment, since [Condition 1] is set, fuel injection for estimating the cetane number of fuel is performed when the engine speed NE decreases. Accordingly, the fuel injection is carried out serially in correspondence with decrease in the engine speed NE. The boundaries are then identified based on the engine speed change amount ΣΔNE, which is obtained through the fuel injection. For example, a plurality of cycles of fuel injection for estimating the fuel cetane number may be fully executed in a single period from when the engine speed NE starts to drop to when such deceleration ends. That is, the multiple cycles of fuel injection are carried out efficiently in conditions with different engine speeds NE.

When the executing condition is not satisfied (Step S301: NO), the procedure is suspended without performing the following part of the procedure, which is a procedure for estimating the fuel cetane number.

Afterwards, the procedure is repeatedly performed until the executing condition is met (Step S301: YES). At this stage, a target fuel injection timing TQstb is set based on the current coolant temperature THW and the supercharging pressure PA (Step S302).

Then, the fuel temperature THQ is detected by the fuel sensor 41 and a correction term K4*b* is calculated based on the fuel temperature THQ (Step S303). That is, in the estimation control procedure, the fuel sensor 41 detects the fuel temperature THQ at a point in time immediately before initiation of fuel injection in the estimation control (specifically, a point in time in the period from when the executing condition is met to when an initial cycle of fuel injection is carried out). Specifically, to detect the fuel temperature THQ, the fuel sensor 41 is switched temporarily to a state functioning as a temperature sensor in response to a signal input from the electronic control unit 40.

In the second embodiment, the relationship between the fuel temperature THQ and the correction term K4*b* capable of reliably canceling an error in the injection amount caused by variation in the bulk modulus of elasticity of fuel is determined in advance through tests and simulations and memorized by the electronic control unit 40. In Step S303, the correction term K4*b* is set based on the relationship and the fuel temperature THQ. Specifically, the correction term K4*b* is calculated as such a value that the target fuel injection time TQtm becomes smaller as the fuel temperature THQ becomes greater.

Then, the target fuel injection amount is corrected with the correction terms K1 to K3, which have been determined in the above-described correction procedure, and the correction term K4*b* (Step S304). In other words, the value obtained by adding the correction term K1 to the target fuel injection timing TQstb is set as an update of the target fuel injection timing TQstb. The value obtained by adding the correction terms K2, K3, K4*b* to the target fuel injection time TQtmb is set as an update of the target fuel injection time TQtmb.

Afterwards, every time the engine speed NE reaches predetermined constant values (NE1, NE2, NE3, . . . NEn), the fuel injection valve 20 is opened based on the target fuel injection timing TQstb and the target fuel injection time TQtmb to inject fuel from the fuel injection valve 20. An indicator of the output torque of the diesel engine 10 produced through fuel injection (the engine speed change amount ΣΔNE) is then calculated and stored (Step S305). In the estimation control procedure, cycles of fuel injection are carried out using a prescribed one (in the second embodiment, the fuel injection valve 20 attached to the cylinder 11 [#1]) of the multiple fuel injection valves 20. The correction terms K1 to K3 used in the second embodiment are calculated as values corresponding to the prescribed one (in the embodiment, the fuel injection valve 20 attached to the cylinder 11 [#1]) of the fuel injection valves 20.

Figure 12:
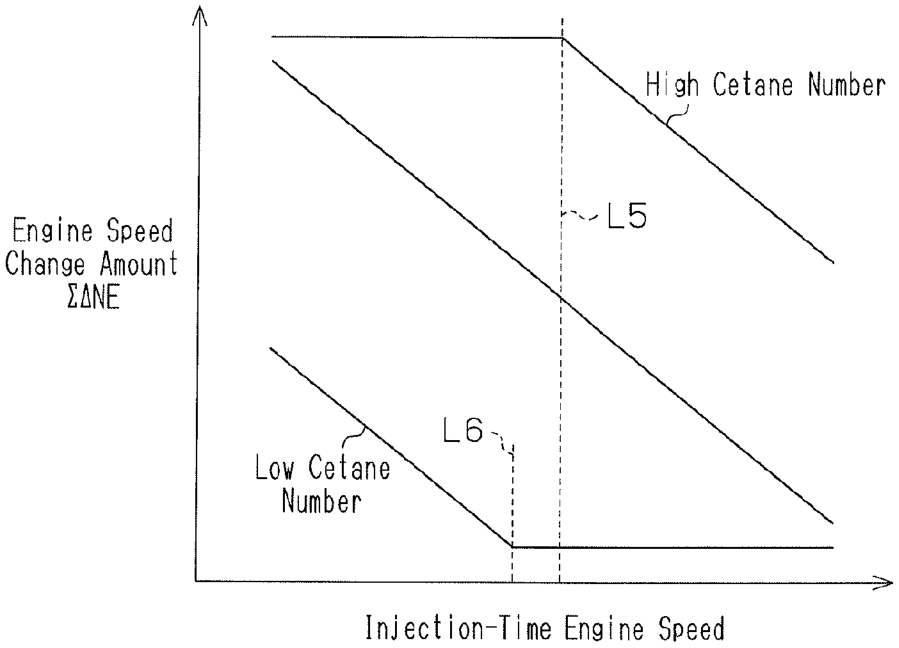
FIG. 12 is a graph representing the relationship among the engine speed change amount, the injection-time engine speed, and the fuel cetane number.

Subsequently, each boundary (specifically, each of the injection-time engine speeds corresponding to lines L5 and L6 in FIG. 12) between the two corresponding ranges in which the engine speed change amount ΣΔNE changes in different manners with respect to variation in the injection-time engine speed is identified and memorized. The engine speed change amounts ΣΔNE at the boundaries are also memorized (Step S306).

An estimated value of the fuel cetane number (an estimated cetane number) is then calculated using the boundaries and the engine speed change amounts ΣΔNE at the boundaries (Step S307). Specifically, the basis for calculation of the estimated cetane number is as follows. For the engine speed change amount ΣΔNE at the boundary that is the value corresponding to the upper limit, it is estimated that the fuel cetane number is greater than a reference value. In this case, the fuel cetane number is estimated to be a greater value as the boundary corresponds to a higher engine speed (in other words, the injection-time engine speed corresponding to the boundary is a greater value). When there is no such boundary, or, in other words, there is no range in which the engine speed change amount ΣΔNE becomes the value corresponding to the upper limit or the lower limit, it is estimated that the fuel cetane number is a value corresponding to the reference. For the engine change amount ΣΔNE at the boundary that is the value corresponding to the lower limit, it is estimated that the fuel cetane number is smaller than the reference value. In this case, the fuel cetane number is estimated to be a smaller value as the boundary corresponds to a lower engine speed (in other words, the injection-time engine speed corresponding to the boundary is a smaller value).

In the second embodiment, the relationship among the cetane number ensuring accurate estimation of the fuel cetane number (specifically, the estimated cetane number), the boundaries, and the engine speed change amounts ΣΔNE at the boundaries is determined in advance through tests and simulations and memorized by the electronic control unit 40. In Step S307, the estimated cetane number is calculated based on the boundaries and the engine speed change amounts ΣΔNE at the boundaries, with reference to the aforementioned relationship.

After the estimated cetane number is determined in the above-described manner, the estimation control procedure is suspended.

The second embodiment, which has been described, has the same advantages as the advantages (1) to (5).

Other Embodiments

The illustrated embodiments may be modified to the forms described below.

In the first embodiment, the parameters for setting the target fuel injection timing TQsta include the coolant temperature THW and the supercharging pressure PA. However, either one or both of the coolant temperature THW and the supercharging pressure PA may be omitted from the setting parameters. In these cases, the engine speed change amount ΣΔNE may be corrected using either one or both of the coolant temperature THW and the supercharging pressure PA. Further, the coolant temperature THW and the supercharging pressure PA may be added as the parameters for calculating the estimated cetane number. Also in these cases, the estimated cetane number is obtained in correspondence with the peak temperature and the peak pressure in the combustion chamber 11*a* in the above-described fuel injection. As a result, the cetane number of fuel is estimated accurately.

In the first embodiment, if there is no such range that the output torque of the diesel engine 10 is maintained constant at the upper or lower limit regardless of the fuel cetane number (or there is only a limited such range), it is unnecessary to set the target fuel injection timing TQsta variably in correspondence with the engine speed NE.

In the first embodiment, the estimated cetane number may be calculated based on the engine speed change amount ΣΔNE, instead of using the injection-time engine speed and the engine speed change amount ΣΔNE as the calculation parameters. Specifically, fuel injection for estimating the cetane number of fuel is performed when the engine speed is a predetermined engine speed NE. The estimated cetane number is calculated based on the engine speed change amount ΣΔNE that is calculated through the fuel injection.

In the second embodiment, the parameters for setting the target fuel injection timing TQstb include the coolant temperature THW and the supercharging pressure PA. However, either one or both of the coolant temperature THW and the supercharging pressure PA may be omitted from the setting parameters. If both are omitted, the target fuel injection timing TQstb before correction with the correction term K1 may be determined in advance. In this case, the engine speed change amount ΣΔNE may be corrected with either one or both of the coolant temperature THW and the supercharging pressure PA. Further, the coolant temperature THW and the supercharging pressure PA may be added to the parameters for calculating the estimated cetane number. Also in these cases, the estimated cetane number is calculated in correspondence with the peak temperature and the peak pressure in the combustion chamber 11*a* in the aforementioned fuel injection. This ensures accurate estimation of the fuel cetane number.

In the second embodiment, the cetane number is estimated based on the aforementioned boundaries (specifically, the injection-time engine speeds at the corresponding boundaries) and the engine speed change amounts ΣΔNE at the boundaries. Instead, the cetane number may be estimated based on the boundaries only. As long as the apparatus has different injection-time engine speeds for the upper limit and the lower limit of the engine speed change amount ΣΔNE, the estimated cetane number can be calculated based on the boundaries only.

In the second embodiment, the method for calculating the boundaries may be modified as needed. For example, the engine speed change amount ΣΔNE may be calculated for a plurality of different injection-time engine speeds. A range in which the engine speed change amount ΣΔNE changes in correspondence with the injection-time engine speed and a range in which the engine speed change amount ΣΔNE is maintained constant regardless of the injection-time engine speed may be identified to determine the boundaries. Alternatively, if the engine speed change amount ΣΔNE calculated for the multiple injection-time engine speeds changes in correspondence with the injection-time engine speed, an expression in which the engine speed change amount ΣΔNE and the injection-time engine speed are variable numbers may be determined. Using the expression, the injection-time engine speed at the time when the engine speed change amount ΣΔNE reaches its lower limit (upper limit) is then determined as the boundary.

In the second embodiment, fuel injection for estimating the fuel cetane number is carried out every time the engine speed NE reaches a predetermined speed. Instead, the fuel injection may be performed each time a predetermined time elapses or the crankshaft 14 rotates at a predetermined crank angle.

In the illustrated embodiments, the timing for detecting the fuel temperature THQ serving as a parameter for calculating the correction term K4*a* (or K4*b*) is not restricted to the point in time immediately before the fuel injection in the estimation control but may be changed to any other suitable point in time. That is, any point in time may be selected as long as the temperature of injected fuel is accurately detected prior to the fuel injection in the estimation control. Specifically, the fuel temperature THQ may be detected when another engine control such as fuel injection control is performed and used as a parameter for calculating the correction term K4*a* (or K4*b*).

In the illustrated embodiments, the procedure for calculating the correction term K4*a* (or K4*b*) or the procedure for correcting the target fuel injection time TQtma (or the target fuel injection time TQtmb) using the correction term K4*a* (or K4*b*) may be omitted.

The cetane number estimation apparatus according to the illustrated embodiments may be applied to an apparatus that calculates only the correction terms K1 and K2 without calculating the correction term K2 in the fuel injection control.

In each of the illustrated embodiments, the target fuel injection amount for the fuel injection in the estimation control is corrected with the correction terms K1 to K3, which have been determined in the fuel injection control. However, fuel injection exclusively for calculating a correction term for correcting the target fuel injection amount may be performed. The correction term is determined based on the difference between actual operating characteristic (a detection time waveform) and prescribed reference operating characteristics (a reference time waveform) of the fuel injection valve 20 in the fuel injection.

Specifically, the correction term may be calculated based on the difference in the point in time at which valve closing is completed between the actual operating characteristics and the reference operating characteristic of the fuel injection valve 20. As has been described, as kinematic viscosity of fuel becomes greater, the speed at which the fuel injection valve 20 closes becomes smaller. Accordingly, if the manner in which the fuel injection valve 20 closes is changed by variation in the fuel kinematic viscosity, such change is reflected as the difference in the point in time at which the valve closing is completed between the actual operating characteristics and the reference operating characteristics of the fuel injection valve 20. In this regard, in the above-described configuration, the correction term for correcting the target fuel injection amount in the estimation control procedure is calculated using the difference in the point in time at which the valve closing is completed as an indicator of the kinematic viscosity of fuel. As a result, the correction term cancels an error in the injection amount caused by variation in the fuel kinematic viscosity.

As the correction term, values corresponding to the correction terms K1 to K3 may be used. That is, any suitable correction term may be employed as long as the correction term appropriately cancels the difference between the actual operating characteristics and the reference operating characteristics of the fuel injection valve 20.

In the illustrated embodiments, a value other than the engine speed change amount ΣΔNE may be calculated as an indicator of the output torque of the diesel engine 10. For example, the engine speed NE at the time of fuel injection for estimating the fuel cetane number (the injection-time engine speed) and the engine speed NE at other times may be both detected. The difference between the detected engine speeds NE is then calculated and used as the indicator of the output torque of the diesel engine 10.

In the illustrated embodiments, the coolant temperature THW used as a parameter for setting the target fuel injection timing TQsta (or TQstb) may be replaced by a value other than the coolant temperature THW that indicates the peak temperature in the combustion chamber 11*a*, such as the temperature of the diesel engine 10 (specifically, the temperature in the cylinder head or the cylinder block of the diesel engine 10) or the temperature of the intake air. Alternatively, the temperature in the combustion chamber 11*a* may be detected directly and employed as a parameter for setting the target fuel injection timing TQsta (or TQstb).

In the illustrated embodiments, instead of using the supercharging pressure PA as a parameter for setting the target injection timing TQsta (or TQstb), a value other than the supercharging pressure PA that indicates the peak pressure in the combustion chamber 11*a*, such as the pressure of the intake air or the atmospheric air, may be employed. Alternatively, the pressure in the combustion chamber 11*a* may be detected directly and used as a parameter for setting the target injection timing TQsta (or TQstb). This configuration can be employed in a diesel engine without a supercharger 16. Specifically, even in the diesel engine without a supercharger 16, the peak pressure in the combustion chamber 11*a* is slightly varied depending on the operating state of the diesel engine or the environment in which the diesel engine is operated. Accordingly, by correcting the target fuel injection timing based on the peak pressure (or an indicator of the peak pressure), accuracy for estimating the fuel cetane number may be improved.

In the illustrated embodiments, the method for determining whether fuel has been supplied to the fuel tank 32 is not restricted to the method using a detection signal from the storage amount sensor 45. That is, any suitable method may be employed, including a method that determines that fuel has been fed to the fuel tank 32 based on the fact that the lid of the fuel tank 32 has been opened and closed.

In the illustrated embodiments, the method for determining whether the fuel in the fuel path has been replaced is not restricted to the method using the amount of the fuel leaking from inside the fuel injection valve 20 to the return line 35. That is, any suitable method may be employed, including a method based on the amount of the fuel supplied to the fuel injection valve 20 or the amount of the fuel injected from the fuel injection valve 20.

In the illustrated embodiments, as long as the procedure for estimating the fuel cetane number can be performed in an appropriate circumstance, the aforementioned executing condition may be changed as needed. For example, any one or two of [Conditions 1 to 3] may be set as the executing condition. Alternatively, [Condition 3] may be replaced by [Condition 4] that "a predetermined time has elapsed since it was determined that fuel had been supplied to the fuel tank 32". As the predetermined time in [Condition 4], a comparatively short time may be set to determine that the fuel in the fuel path has been replaced, as in the case of [Condition 3]. In contrast, by setting the predetermined time to a comparatively great value, it may be determined that it is likely that the quality of fuel in the fuel tank 32 has been changed due to the time that has elapsed since fuel supply. In this case, the procedure for estimating the fuel cetane number may be carried out based on such determination. Alternatively, [Condition 5] that "operation for stopping the diesel engine 10 has been performed" may be set. When the diesel engine 10 is stopped, the temperature of the diesel engine 10 is sufficiently high in many cases. It is thus highly likely that the engine operating state is stable compared to a case in which the temperature of the diesel engine 10 is low. Therefore, in this circumstance, it is possible to estimate the fuel cetane number accurately based on the engine speed NE (specifically, the engine speed change amount ΣΔNE). By setting [Condition 5], the procedure for estimating the fuel cetane number is carried out in the circumstance. Additionally, the fuel cetane number to be used at the time when the diesel engine 10 is started is estimated accurately. This improves starting performance of the diesel engine 10. Specifically, it is determined that [Condition 5] is met based on, for example, the fact that the driver has manipulated the operating switch in such a manner as to stop the diesel engine 10.

The fuel sensor 41, which functions as both a pressure sensor and a temperature sensor, may be replaced by a pressure sensor and a temperature sensor that are arranged separately. In this case, as long as the pressure sensor appropriately detects pressure that indicates the fuel pressure in the fuel injection valve 20 (specifically, the nozzle chamber 25), which is fuel pressure varied by variation in the fuel pressure in the fuel injection valve 20, the pressure sensor does not necessarily have to be mounted directly in the fuel injection valve 20 but may be arranged in any suitable modified manner. Specifically, the pressure sensor may be mounted in the branch line 31*a* or the common rail 34. Similarly, as long as the temperature sensor appropriately detects the temperature of fuel actually injected from the fuel injection valve 20, the temperature sensor does not necessarily have to be mounted directly in the fuel injection valve 20 but may be arranged in any suitable modified manner. Specifically, the temperature sensor may be mounted in the branch line 31*a* or the common rail 34.

Instead of the fuel injection valve 20, which is a type driven by the piezoelectric actuator 29, a fuel injection valve of a type driven by an electromagnetic actuator having a solenoid coil, for example, may be employed.

The present invention is not restricted to use in a diesel engine with four cylinders but may be used in a single-cylinder diesel engine or a diesel engine including two or three or five or more cylinders.

The invention claimed is:

1. A cetane number estimation apparatus that estimates the cetane number of fuel supplied to a diesel engine having a fuel injection valve, the apparatus comprising:

a pressure sensor for detecting fuel pressure varied by variation in actual fuel pressure in the fuel injection valve at the time of the fuel injection from the fuel injection valve;

a pressure correcting section that is adapted to calculate actual operating characteristics of the fuel injection valve based on a variation waveform of the detected fuel pressure, and to correct the target fuel injection amount based on the difference between the calculated actual operating characteristics and prescribed reference operating characteristics; and an electronic control unit that is adapted to inject fuel from the fuel injection valve based on the corrected target fuel injection amount, calculate an indicator of output torque of the diesel engine produced through fuel injection, and estimate the cetane number of the fuel based on the calculated indicator of the output torque.

2. The cetane number estimation apparatus according to claim 1, further comprising:

a temperature sensor for detecting fuel temperature; and a temperature correcting section adapted to correct the target fuel injection amount based on the detected fuel temperature.

3. The cetane number estimation apparatus according to claim 2, wherein the temperature sensor is attached to the fuel injection valve.

4. The cetane number estimation apparatus according to claim 2, wherein the temperature sensor detects the fuel temperature immediately before initiation of fuel injection based on the target fuel injection amount, and wherein the temperature correcting section is adapted to correct the target fuel injection amount based on the detected fuel temperature.

5. The cetane number estimation apparatus according to claim 1, wherein the pressure sensor is attached to the fuel injection valve.

6. A cetane number estimation apparatus that injects fuel from a fuel injection valve in a diesel engine based on a target fuel injection amount, calculates an indicator of output torque of the diesel engine produced through fuel injection, and estimates the cetane number of the fuel using the calculated indicator, the apparatus comprising:

a pressure sensor for detecting fuel pressure varied by variation in actual fuel pressure in the fuel injection valve at the time of the fuel injection;

a pressure correcting section that is adapted to correct the target fuel injection amount in such a manner as to correct an amount corresponding to an error in the actual fuel injection amount caused by variation in kinematic viscosity of the fuel based on a variation waveform of the detected fuel pressure;

a temperature sensor for detecting the temperature of the fuel; and a temperature correcting section that is adapted to correct the target fuel injection amount in such a manner as to correct an amount corresponding to an error in the actual fuel injection amount caused by variation in the bulk modulus of elasticity of the fuel based on the detected fuel temperature.

7. The cetane number estimation apparatus according to claim 6, wherein the pressure correcting section is adapted to calculate actual operating characteristics of the fuel injection valve based on a variation waveform of the detected fuel pressure and to correct the target fuel injection amount based on the difference between the calculated actual operating characteristics and prescribed reference operating characteristics.

* * * * *